US008085764B1

(12) United States Patent
McCrosky et al.

(10) Patent No.: US 8,085,764 B1
(45) Date of Patent: Dec. 27, 2011

(54) EGRESS SELECTION SWITCH ARCHITECTURE WITH POWER MANAGEMENT

(75) Inventors: Carl Dietz McCrosky, Saskatoon (CA); Andrew Milton Hughes, Saskatoon (CA); Winston Ki-Cheong Mok, Vancouver (CA); Nicholas Wayne Rolheiser, Saskatoon (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 69 days.

(21) Appl. No.: 12/175,243

(22) Filed: Jul. 17, 2008

Related U.S. Application Data

(63) Continuation of application No. 10/765,945, filed on Jan. 29, 2004, now Pat. No. 7,417,985, which is a continuation-in-part of application No. 10/354,046, filed on Jan. 30, 2003, now abandoned.

(60) Provisional application No. 60/490,531, filed on Jul. 29, 2003.

(51) Int. Cl.
*H04L 12/50* (2006.01)
(52) U.S. Cl. .......................................... 370/375; 370/376
(58) Field of Classification Search .................. 370/360, 370/363, 375, 376, 388, 413
See application file for complete search history.

(56) References Cited

U.S. PATENT DOCUMENTS

| | | | |
|---|---|---|---|
| 4,701,907 A | 10/1987 | Collins | |
| 4,724,340 A | 2/1988 | Sood | |
| 5,390,333 A | 2/1995 | Pritt et al. | |
| 6,044,209 A * | 3/2000 | Alpert et al. | 716/6 |
| 6,188,686 B1 * | 2/2001 | Smith | 370/388 |
| 6,243,779 B1 | 6/2001 | Devanney et al. | |
| 6,567,417 B2 * | 5/2003 | Kalkunte et al. | 370/428 |
| 6,600,741 B1 * | 7/2003 | Chrin et al. | 370/375 |
| 7,058,008 B1 * | 6/2006 | Wilson et al. | 370/216 |
| 7,315,552 B2 * | 1/2008 | Kalkunte et al. | 370/428 |
| 7,349,387 B2 * | 3/2008 | Wu | 370/360 |
| 7,359,316 B1 * | 4/2008 | Fukunaga et al. | 370/217 |
| 7,391,787 B1 * | 6/2008 | McCrosky | 370/413 |
| 7,417,985 B1 * | 8/2008 | McCrosky et al. | 370/375 |
| 7,447,197 B2 * | 11/2008 | Terrell et al. | 370/360 |
| 7,492,760 B1 * | 2/2009 | Plante et al. | 370/363 |
| 7,697,502 B2 * | 4/2010 | Ryan et al. | 370/351 |
| 2002/0070759 A1 | 6/2002 | Ohyama et al. | |
| 2005/0063370 A1 * | 3/2005 | Beshai et al. | 370/360 |
| 2007/0115958 A1 | 5/2007 | Kamiya et al. | |

OTHER PUBLICATIONS

Hui, "Switching and Traffic Theory for Integrated Broadband Networks", Kluwer Academic Publishers, 1990, Chapter 3.2, pp. 56-60.

* cited by examiner

*Primary Examiner* — Dang Ton
*Assistant Examiner* — Brian O Connor
(74) *Attorney, Agent, or Firm* — Alexander Anishehenko; Borden Ladner Gervais LLP

(57) ABSTRACT

A method and an apparatus for reducing power consumption and digital logic noise in a time division multiplexed memory switch. The method is embodied in an egress selection switch (ESS) block architecture. The ESS block includes a data disable block which prevents the propagation of data, in particular ingress grains, to a given group of egress ports if the data is not selected by any of the egress ports in a given group. While the ingress data disable method partitions ports into groups and saves power by disabling the fanout tree from the root on a port group basis, the egress data disable method saves power on a port group basis by disabling the fanout tree from the tail end in addition to applying the ingress data disable method. The ESS block also includes an grain select block for selecting and storing a given ingress grain for eventual output to an egress port.

10 Claims, 19 Drawing Sheets

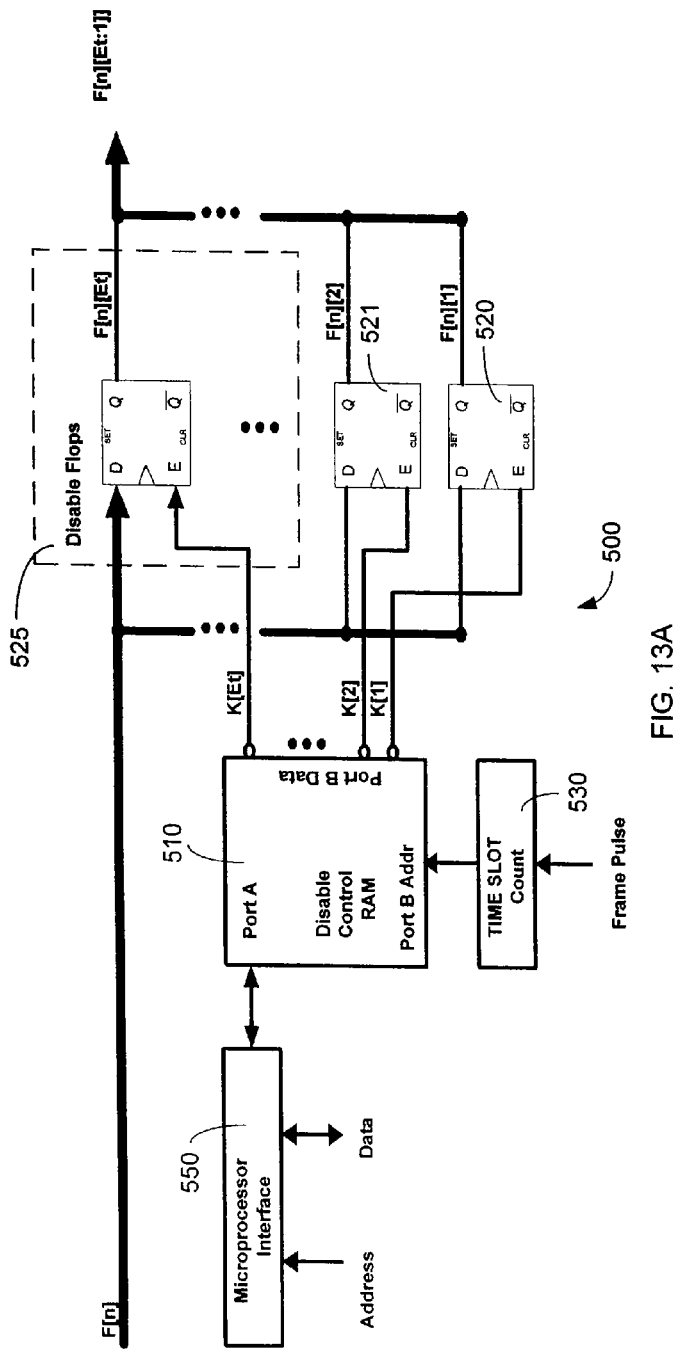
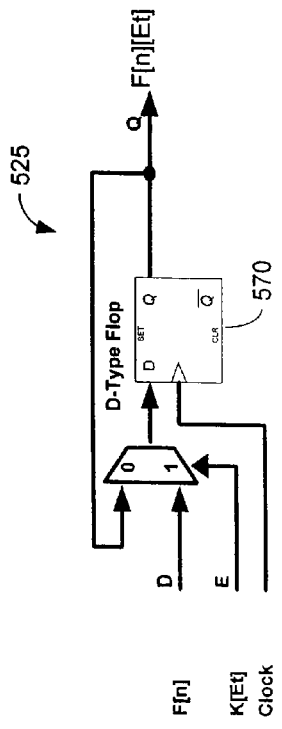
FIG. 13A
FIG. 13B

EGRESS SELECTION SWITCH ARCHITECTURE WITH POWER MANAGEMENT

RELATED APPLICATIONS

The present application is a continuation of non-provisional application Ser. No. 10/765,945 filed Jan. 29, 2004, which is a continuation-in-part claiming benefit of a non-provisional application Ser. No. 10/354,046, filed Jan. 30, 2003, and of a provisional application Ser. No. 60/490,531, filed Jul. 29, 2003.

BACKGROUND OF THE INVENTION

1. Field of the Invention

The present invention relates to switch architecture that requires fanout of ingress grains to multiple egress ports.

2. Description of the Prior Art

In the field of telecommunications, one of the most important constraints in designing telecommunication systems is that of power consumption. Telecommunication systems, embodied in printed circuit boards, typically have a maximum power budget of between 100 W and 120 W. The maximum allowable power is in part constrained by the ability to cool the system—the mean time before failure (MTBF) decreases with an increase in operating temperature. The MTBF is calculated as an average time interval, usually expressed in thousands or tens of thousands of hours, that a hardware component fails and requires service. Although many devices are often found on a printed circuit board, the switch fabric component often consumes the majority of the power. As power consumption will increase along with the switch capacity, it is important to reduce power consumption of the switching component to enable the design of large switching systems. Moreover, as power consumed by large switching system chips results in digital noise, the reduction in power consumption will result in the reduction of digital noise.

For large switching systems, time division multiplexing (TDM) is a technique to combine multiple data streams at a lower rate into a single higher rate signal, by separating the higher rate signal into N segments. The circuit component that combines signals at the source end of a communication link is known as a multiplexer. The multiplexer accepts the input from N lower rate signals, breaks each signal into segments, and assigns the segments to the higher rate signal in a rotating, repeating sequence. The frequency of the higher rate signal is N times the frequency of the lower rate signal. At the other end of the communication link, the individual lower rate signals are separated out by means of a circuit called a demultiplexer. The demultiplexer regenerates each lower rate signal by extracting one segment from every N segments of the higher rate signal. The same rotating, repeating sequence is used by the demultiplexer. A two-way communication link requires a multiplexer/demultiplexer at each end of the link.

The Synchronous Optical Network (SONET) and the Synchronous Digital Hierarchy (SDH) standards are two examples of systems which utilize TDM. In SONET, the base signal rate is 51.84 Mbps, referred to as the STS-1 signal. Forty-eight STS-1 signals are multiplexed to form an STS-48 signal and 192 STS-1 signals are multiplexed to form an STS-192 signal and so on. The SDH standard defines a similar signal hierarchy.

It is well known in the field of telecommunications that TDM switches are used to cross-connect lower rate signals contained within a higher rate signal. The lower rate signal will be hereinafter referred to as a grain. The collection of lower rate signals, grains, that form a higher rate signal is referred to as a grain group. A grain group is therefore composed of a fixed number of grains.

The following publication, incorporated herein by reference, is a snapshot of the current state of the art in switching architectures: J. Hui, Switching and Traffic Theory for Integrated Broadband Networks, Kluwer Academic Publishers, 1990. The Hui reference discusses the crosspoint complexity and power consumption related to the crosspoint count in Very Large Scale Integration (VLSI) chips having switch components. A crosspoint is defined as the connection between two pins in a given chip. Hui notes that VLSI chips in general have limitations related to the number of pins per chip and the fan-in and fan-out capability of each pin. Accordingly, the crosspoint point count in switch components is also limited. While the Hui reference discusses multiple-stage switching networks as a possible solution to minimizing the crosspoint count, there is no discussion of disabling the propagation of data along a given crosspoint path. In further discussion, Hui defines switching networks as non-blocking networks. A non-blocking network ensures that there is always a free crosspoint path available for any connection required. In a non-blocking network, the connections are made without disturbing existing connections. However, Hui notes that, as data traffic patterns are ever-changing, the management of non-blockings networks is complex. Also, the cost of changing the topology of the switch connections may be costly.

Another problem in the art is that the amount of power consumed by the switch component is directly related to an increase in crosspoint counts. Thus, there is a need in the art to provide a switch architecture which has a power management functionality. Furthermore, the power consumed will vary with the data propagating through the switch. A power spike, and therefore current spike, will occur when the datapath transitions from a state where constant data is propagating to a state where the majority of the data toggles to a new value. There is a need in the art to reduce the average power consumption and reduce the maximum number of data transition to reduce the amplitude of current spikes.

One switch architecture is an egress selection switch (ESS) block architecture. The ESS architecture is composed of one ESS block for each egress port. The ESS switch architecture is an output buffered memory switch. An output memory buffered switch, known in the art, resolves contention for egress ports by connecting each ingress port to every egress port. Each egress port then selects and stores only the data of interest for subsequent output. The power consumption of an ESS architecture, and similar switch architectures, is dominated by the toggling of the wires and the connections required to transmit data from each ingress port to every egress port. Such systems are power inefficient as each egress port receives data from all N ingress ports but selects at most 1/Nth of the data for output.

In the prior art, a constant overwrite method for integrated circuits is taught in U.S. Pat. No. 4,724,340, issued to Sood. However, the Sood patent does not provide a method of data overwriting that is applied to signals internal to a data switch.

In view of the above-noted shortcomings, the present invention seeks to provide apparatus in a plurality of embodiments for reducing the level of power consumption and the amount of switching noise induced in the digital logic of a time division multiplexed memory switch. The present invention further seeks to provide a switch having a data disable block to minimize toggle of wires and logic used to fanout ingress grains to egress ports.

SUMMARY OF THE INVENTION

The present invention provides a method and an apparatus for reducing power consumption in a TDM memory switch. The method is embodied in the ESS switch architecture. The method improves the power efficiency of ESS blocks of the ESS switch architecture by grouping the egress ports into two or more groups. The ESS switch includes at least one data disable block which prevents the propagation of data, in particular ingress grains, to a given group of egress ports if the data is not selected by any of the egress ports in a given group. The data disable block implements both an ingress data disable method and an egress data disable method. The egress select data disable method is a variant of the ingress and egress data disable methods. The ESS block also includes at least one grain select block for selecting and storing a given ingress grain for eventual output to an egress port.

The invention provides an ingress data disable method where the egress ports of the ESS block are logically partitioned into multiple egress port groups. Once grouped, unicast ingress grains require distribution to one egress port group only as only one egress port selects the grain. Ingress grains are defined as unicast in that they are only selected by one egress port. Therefore, the power consumed for unicast traffic (1/number of egress port groups) is improved over the prior art as only one egress port group need be enabled. This is done by reducing the amount of power in the fanout tree for devices and wiring that are in the datapath from the ingress port to the input of the ESS block and from the input of the ESS block to grain storage element within the grain select block of an ESS block. Grains that are multicast to more than one egress port require fanout to one or more egress port groups. Multicasting is defined as the propagation of a single data grain from a given ingress port to more than one egress port. Additional power savings will result from multicasting ingress grains to ports within the same egress port group. The power savings is due to the reduction in the number of fanout trees that need to be enabled for a multicast ingress grain.

While the ingress data disable method partitions ports into groups and saves power by disabling the fanout tree from the root on a port group basis, the egress data disable method saves power on a port group basis by disabling the fanout tree from the tail end in addition to applying the ingress data disable method. The root of the fanout tree is at the output of an ingress port. The tail end of the fanout tree is at the input of the grain storage element within the grain select block of an ESS block. The grain select block selects and stores a given ingress grain for eventual output to an egress port.

The egress select data disable method achieves the additional benefits of the ingress and egress data disable methods by enabling propagation of only those grains selected for egress through the complete path from the head of the fanout tree to the tail of the fanout tree. Power savings are provided as the number of port groups remain equivalent to the number of ingress ports.

The present invention advantageously reduces the long term average power consumption of the fanout tree. Furthermore, the present invention provides a constant overwrite method implemented in ingress and egress data disable methods to reduce the amplitude of the spike.

The method and apparatus of the present invention is advantageous for the design of memory switches with constrained power budgets. The present invention further enhances memory switches with a large aggregate data throughput, otherwise limited by the power consumption constraints of integrated circuit (IC) technologies. As such, the present invention may be embodied in any type of switch that requires fanout of data from a single ingress port to many egress ports.

In a first aspect the present invention provides a system for improving power efficiency of a memory switch, said memory switch enabling propagation of data, through said memory switch, from a source to a plurality of destinations, said system comprising: at least one grain select block for selecting and storing specific data, said specific data being propagated to a subset of destinations within said plurality of destinations, each grain select block containing fanout information for propagating said specific data to said group of destinations; at least one data disable block for providing a data connection from said source to said at least one grain select block based on said fanout information, said at least one data disable block receiving said data from said source; wherein said specific data is propagated over a pre-defined interval of time from said at least one data disable block to said at least one grain select block.

In a second aspect, the present invention provides an egress selection switch block, comprising: a plurality of grain select blocks for selecting and storing a plurality of ingress data grains, each grain select block having: a connection memory having memory contents defining an egress data grain at a corresponding grain select block, said egress data grain being defined by a pre-selected ingress port and a pre-selected timeslot of said plurality of ingress data grains; a multiplexer for selecting a particular ingress data grain based on said pre-selected ingress port and said pre-selected timeslot in said connection memory; a data storage device for storing output received from said multiplexer; and means for outputting said egress data grain from said data storage device to said plurality of egress ports.

In a third aspect, the present invention provides an egress selection switch, comprising: a plurality of ingress ports for transmitting a plurality of ingress data grains; a plurality of egress ports for receiving a plurality of egress data grains, said plurality of egress ports forming at least two egress port groups; a timeslot counter for identifying a particular timeslot number for each ingress data grain of said plurality of ingress data grains; and a plurality of egress selection switch blocks for selecting and storing said plurality of ingress data grains, each egress selection switch block containing a plurality of grain select blocks having: a connection memory having memory contents defining an egress data grain at a corresponding grain select block, said egress data grain being defined by a pre-selected ingress port and a pre-selected timeslot of said plurality of ingress data grains; a multiplexer for selecting a particular ingress data grain based on said pre-selected ingress port and said pre-selected timeslot in said connection memory; a data storage device for storing output received from said multiplexer; and means for outputting said egress data grain from said data storage device to said plurality of egress ports; wherein said time slot counter is coupled to said plurality of grain select blocks.

In a fourth aspect, the present invention provides an egress selection switch, comprising: a plurality of data disable blocks for fanout of ingress data grains to at least one of said plurality of egress ports, each data disable block having: a data disable control memory; and a plurality of data storage devices being coupled to said data disable control memory, each data storage device of said plurality data storage devices propagating a particular ingress data grain to a particular egress port group and enabling propagation of said particular ingress data grain based on information stored in said data disable control memory; wherein said data disable control memory is connected to said plurality of data storage devices.

In a fifth aspect, the present invention provides an egress selection switch, comprising: a plurality of ingress ports for transmitting a plurality of ingress data grains; a plurality of egress ports for receiving a plurality of egress data grains, said plurality of egress ports forming at least two egress port groups; a timeslot counter for identifying a particular timeslot number for each ingress data grain of said plurality of ingress data grains; and a plurality of data disable blocks for fanout of ingress data grains to at least one of said plurality of egress ports, each data disable block of said plurality of data disable blocks having: a data disable control memory; and a plurality of data storage devices being coupled to said data disable control memory, each data storage device of said plurality data storage devices propagating a particular ingress data grain to a particular egress port group and enabling propagation of said particular ingress data grain based on information stored in said data disable control memory; wherein said data disable control memory is connected to said plurality of data storage devices; and wherein said time slot counter is coupled to said data disable control memory.

In a sixth aspect, the present invention provides a method for improving efficiency of a data switch, said data switch propagating transmission of ingress data to at least one egress port in a pre-defined interval of time from an ingress side of said switch to an egress side of said switch, said method comprising steps: a) grouping a plurality of egress ports into at least two egress port groups; b) disabling said propagation of said ingress data to at least one egress port group of said at least two egress port groups; c) defining egress data based on a predefined selection of said ingress data by at least one egress port group being enabled for propagation of said ingress data; and d) storing said egress data and said ingress data for output to said corresponding egress port.

In a seventh aspect, the present invention provides a method for improving efficiency of a data switch, said data switch propagating transmission of ingress data to at least one egress port in a pre-defined interval of time from an ingress side of said switch to an egress side of said switch, said method comprising steps: a) grouping a plurality of egress ports into at least two egress port groups; b) generating signals containing a predefined data selection for propagation, from said egress side to said ingress side, through a data fanout tree; c) disabling propagation of said ingress data to at least one egress port group of said at least two egress port groups based on said predefined data selection; d) defining egress data based on said predefined data selection of said ingress data by at least one egress port group being enabled for propagation of said ingress data; and e) storing said egress data and said ingress data for output to said corresponding egress port.

In an eighth aspect, the present invention provides an egress selection switch, comprising: a plurality of grain select blocks for selecting and storing a plurality of ingress data grains, each grain select block having: a connection memory having memory contents defining an egress data grain at a corresponding grain select block, said egress data grain being defined by a pre-selected ingress port and a pre-selected timeslot of said plurality of ingress data grains; a multiplexer for selecting a particular ingress data grain through fanout based on said pre-selected ingress port and said pre-selected timeslot in said connection memory; a data storage device for storing output received from said multiplexer; and means for outputting said egress data grain from said data storage device to said plurality of egress ports; wherein said connection memory having decode logic to generate a signal from said each grain select block for selectively enabling and disabling fanout of said plurality of ingress data grains.

In a ninth aspect, the present invention provides a system for improving power efficiency of a memory switch, said memory switch enabling propagation of data, through said memory switch, from a source to a plurality of destinations, said system comprising: at least one grain select block for selecting and storing specific data, said specific data being propagated to a subset of destinations within said plurality of destinations, each grain select block containing fanout information for propagating said specific data to said group of destinations through a fanout tree; at least one data disable block for providing a data connection from said source to said at least one grain select block based on said fanout information, said at least one data disable block receiving said data from said source; wherein said specific data is propagated over a pre-defined interval of time from said at least one data disable block to said at least one grain select block, and wherein said fanout information is generated as a signal propagating from a tail end of said fanout tree to a root end of said fanout tree to enable propagation of said specific data from said source.

BRIEF DESCRIPTION OF THE DRAWINGS

FIG. 13a is a block diagram of a hardware circuit layout of a data disable block according to the present invention.

FIG. 13b is an exploded view of a data disable flip flop of FIG. 13a according to the present invention.

FIG. 15 is an illustration of a possible organization of the control memory of the data disable block of FIG. 13a.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Figure 1:
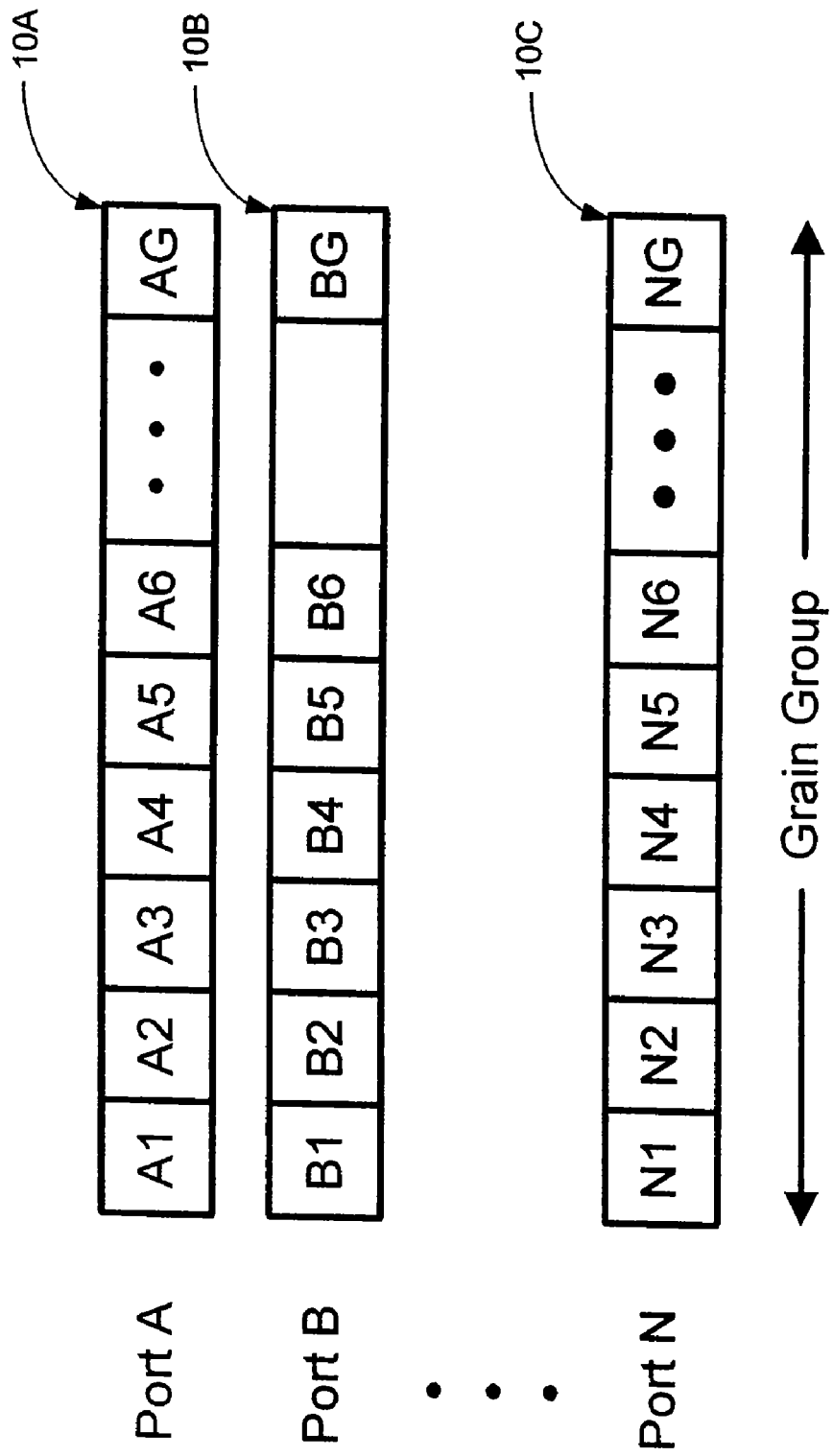
FIG. 1 is an example of Time Division Multiplexed (TDM) data aligned across multiple ports of the prior art.

FIG. 1 shows a series of aligned Time Division Multiplex (TDM) channels 10A, 10B, 10C, suitable for switching purposes as is well known in the art. In a TDM data channel, a data stream is multiplexed according to location in time. The location refers to the given port, Port A, Port B, Port N, in receipt of the data signal. Each TDM data channel 10A, 10B, 10C, is aligned with a given port, Port A, Port B, Port N. For example, the TDM data channel 10A is aligned with Port A, such that a data stream multiplexed along the TDM data channel 10A is received at Port A. Each of the TDM data channels 10A, 10B, 10C, as shown, have a finite number time slots, numbered 1 through G. Each slot A1, A2, . . . AG, B1, B2, BG, C1, C2, CG is a grain, as defined earlier in this document, and each grain is part of a grain group. Accordingly, the grains A1, A2, . . . AG form part of a grain group multiplexed along the corresponding TDM data channel 10A. Each TDM data channel is synchronized to a clock to multiplex the data stream of grains. A stream of grains is aligned with the clock at the start of the grain group.

In SONET applications, the data signal is aligned with an 8 kHz clock at the start of the SONET data frame. A stream within a TDM channel is identified by its offset from the signal, with an individual datum recurring every G clock ticks within the data stream. The grain group size G defines the granularity of switching possible in a particular TDM system. Therefore, a datum, essentially a data value, for a given TDM channel is present in a data stream every G clock ticks with each clock tick often referred to as a time slot. For example, one sample from a STS-1 signal forms each grain of a SONET system. A STS-48 signal is formed from 48 such grains, and therefore, the grain group size is 48.

Figure 2:
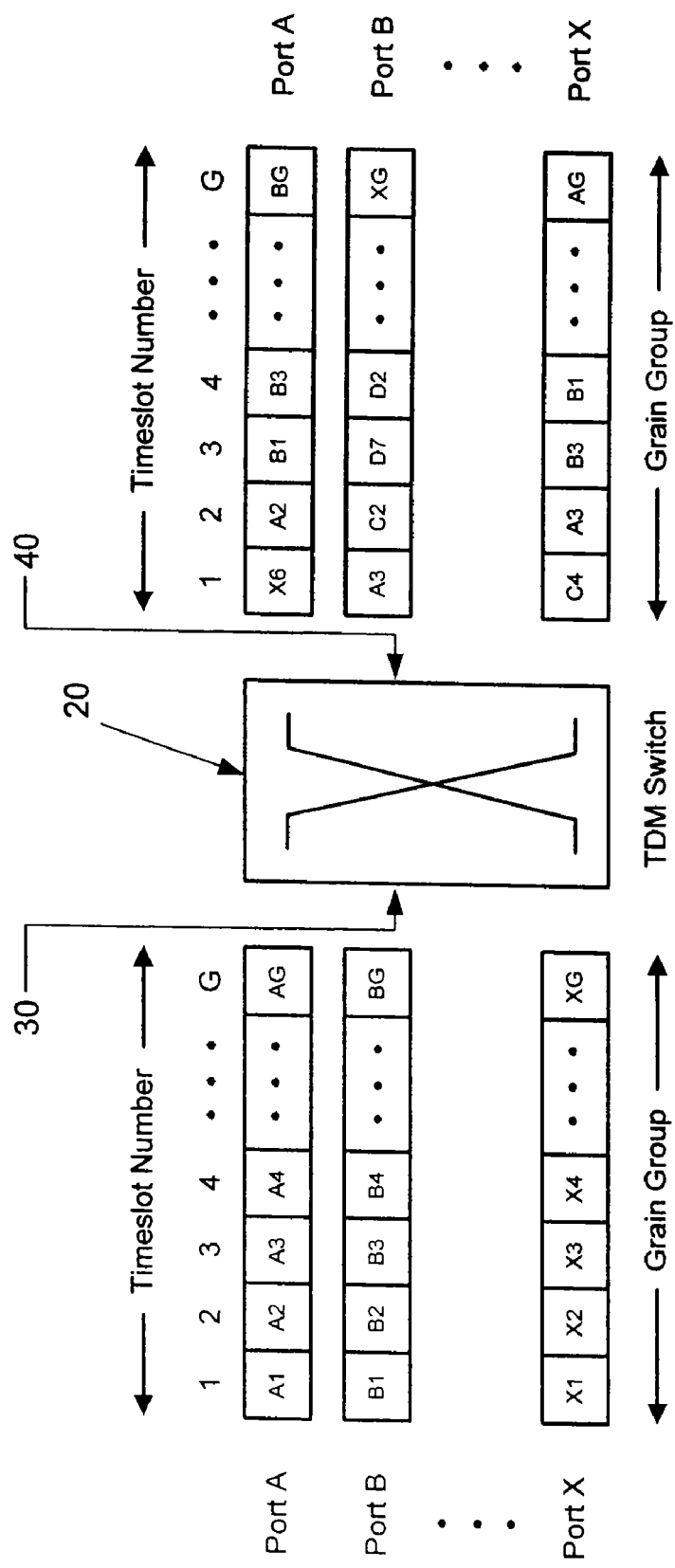
FIG. 2 is an illustration of a TDM data channel switch of the prior art.

FIG. 2 illustrates a TDM channel switch 20 of the prior art. In general, a switch can be any number of inputs to any number of outputs. While only switches of n inputs and n outputs (N×N) are shown, the present invention may incorporate asymmetrical switches of various numbers of input and output ports. In FIG. 2, the grains A1, A2, . . . X4, . . . XG, which are essentially bytes of data, are labelled with a letter A, B, . . . X, representing the input port, Port A, Port B, . . . . Port X. The grains, A1, A2, . . . X4, . . . XG, are also labelled with a number, 1 through G, representing the byte position at the port Port A, Port B, . . . . Port X. Such labelling is consistent to illustrate the switching of grains from the input side 30 to the output side 40 of the switch 20. As shown on the output side 40, grains may be reordered to any position. The grains may also be multicast to several ports (or a single port), and certain grains may be dropped. FIG. 2 shows switching of grains A1, A2, . . . X4, . . . XG within several grain groups.

Figure 3:
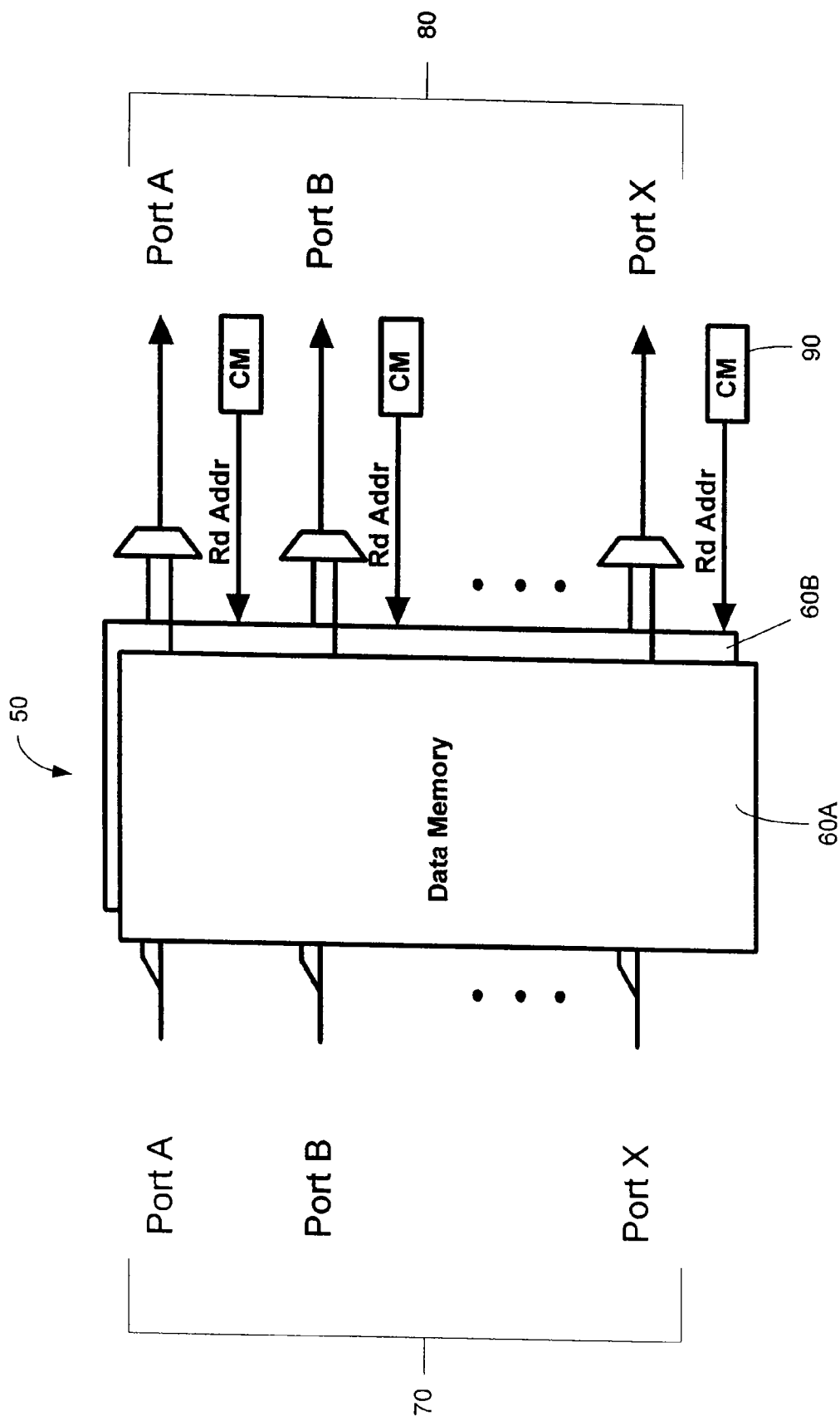
FIG. 3 is an illustration of a conceptual implementation of an N×N memory switch of the prior art.

FIG. 3 illustrates a conceptual implementation of an N×N memory switch 50 of the prior art. The memory switch consists of two data memory blocks 60a, 60b. Each memory block 60a, 60b has N write ports and N read ports. The ingress ports 70 each write one grain group of data to one memory block, e.g. 60a, while the egress ports 80 each read one grain group of data from the other memory block, e.g. 60b. The ingress ports and egress ports alternate data accesses between the two memories every grain group with the ingress ports and egress ports always addressing different memories. As such, ingress ports 70 write a grain group to a first memory block 60a, while the egress ports 80 read a grain group from the second memory block 60b. The ingress ports then write a grain group to the second memory block 60b while the egress ports read a grain group from the first memory block 60a. Accordingly, a memory block will access each grain group in an alternating sequence. The ingress ports 70 write data into memory blocks at an address that is indexed by the ingress port and timeslot numbers of the ingress grain. Egress ports 80 read data from the address required to select the desired ingress grain thereby achieving the switching of ingress data to egress ports. The read address of the egress ports is defined by a connection memory 90 that is configured by the user.

However, it is not practical to build memory blocks with more than 3 or 4 ports, as shown in the prior art FIG. 3. An alternative but functionally equivalent implementation of the memory switch of FIG. 3 is the output buffered switch 100 of FIG. 4. The output buffered switch 100 implements data storage 101 at each egress port, Out Port A, Out Port B, Out Port C, with connection memory controlled multiplexing selecting the ingress grains, of ingress ports, In Port A, In Port B, . . . In Port N, to store. The data storage 101 requires one read port but multiple write ports. Multiple memories may be required to reduce the number of write ports required for any one instance of the memory.

Figure 4:
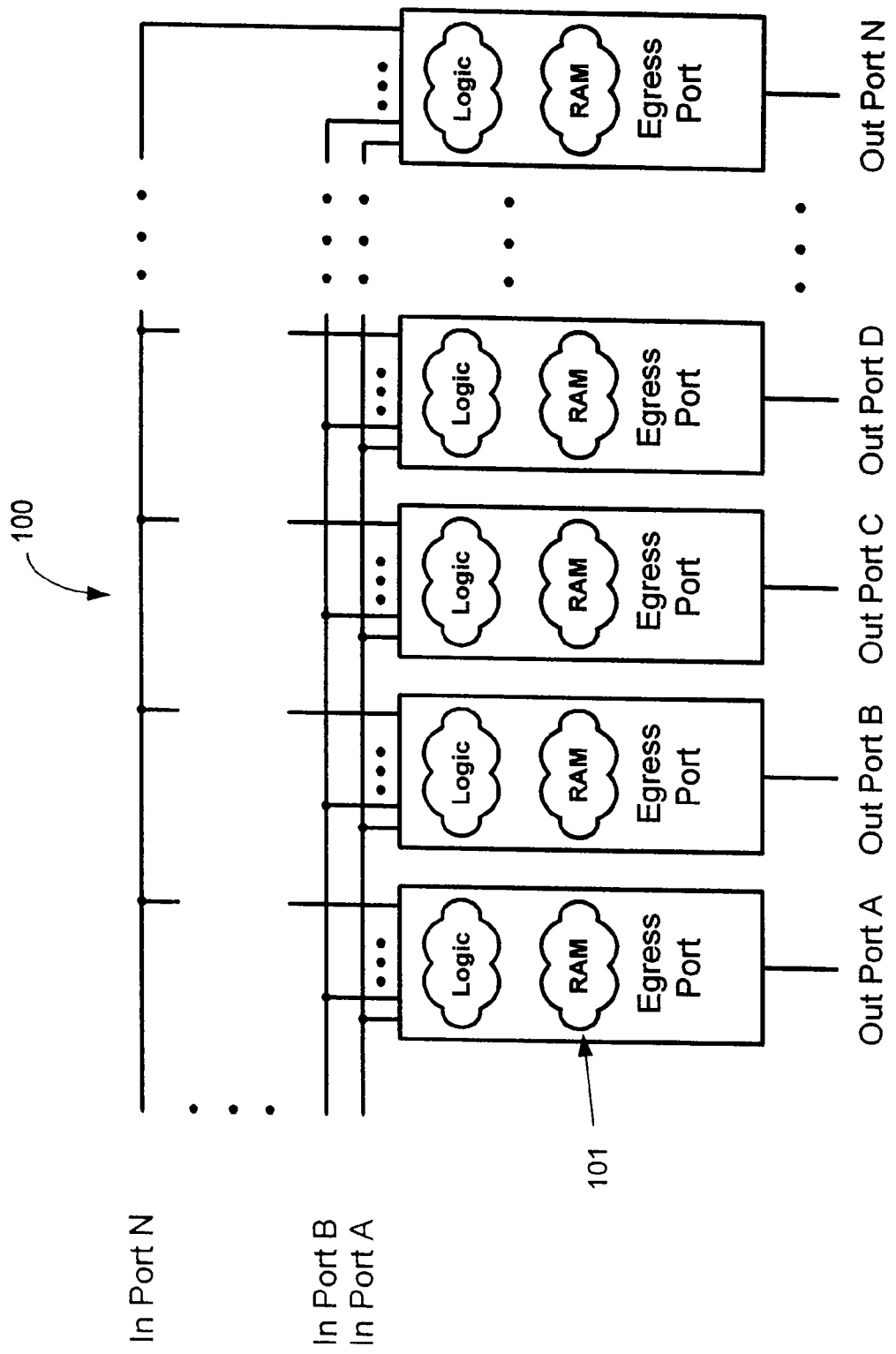
FIG. 4 is an illustration of an output buffered memory switch of the prior art.

FIG. 4 illustrates a typical implementation of the output buffered memory switch 100 of the prior art. Again, this example is for illustrative purposes only as the present invention is equally applicable to other switch architectures that require fanout of ingress data to multiple egress ports. Fanout consists of both a buffer tree that may or may not be pipelined, multiplexing logic to select the desired ingress grain, and memory to store the data for later output to the egress ports. Such implementations, however, are not power efficient. Every ingress grain from every ingress port is forwarded to each egress port although the grain may not be selected for output. Specifically, the total power consumed by the fanout logic and tree from the output of the ingress block up to the point where data is stored in memory at the egress port is as follows.

$$P_{total} = \Sigma_{m=1}^{\#ofIngressPorts} P_{FanoutFromIngressPortmToAllEgressPorts}$$

where $P_{FanoutFromIngressPortmToAllEgressPorts}$ is the power consumed during the fanout from Ingress port m to all egress ports;

m is the number of ingress ports; and $P_{total}$ is the total power consumed by the logic and fanout from the m ingress ports to all egress ports.

A major disadvantage of output buffered switch 100 architecture is the number of connections, required from each input to every output. In an N×N switch, for large N, the wiring capacitance, logic buffering, and egress port logic required to deliver the ingress data to the egress ports consumes a significant amount of power. Energy is consumed in the form of toggle activity on the interconnect wires and logic in the data path to the egress port data storage. The toggle activity is defined by a change in the logic state (0 or 1) of the connections. Each toggle, defined by a change in the logic state, results in dissipation of energy in the wire capacitance, the memory buffers, and the egress port logic. As such, only 1/Nth of the energy expended on toggle activity does useful work—as each egress port receives N*G grains per grain group but only selects G grains for output.

In addition to consuming a significant amount of power, the toggling of the fanout tree generates noise that can result in power supply voltage variation that exceeds the operating limits of the digital logic in the prior art switch. The current needed to charge and discharge the parasitic capacitors of the fanout tree must be supplied by the external power supply. In a large TDM switch, the current demand can be very large, in the order of 100 Amperes and lasts for only a short period of time. The magnitude of the current demand spike is proportional to the number of data bits that changes state from logic high to logic low or vice versa, from one clock cycle to the next. Thus, the current demand can vary from zero, in the case where the data is constant, to a maximum, in the case where all the data bits toggle.

Figure 5:
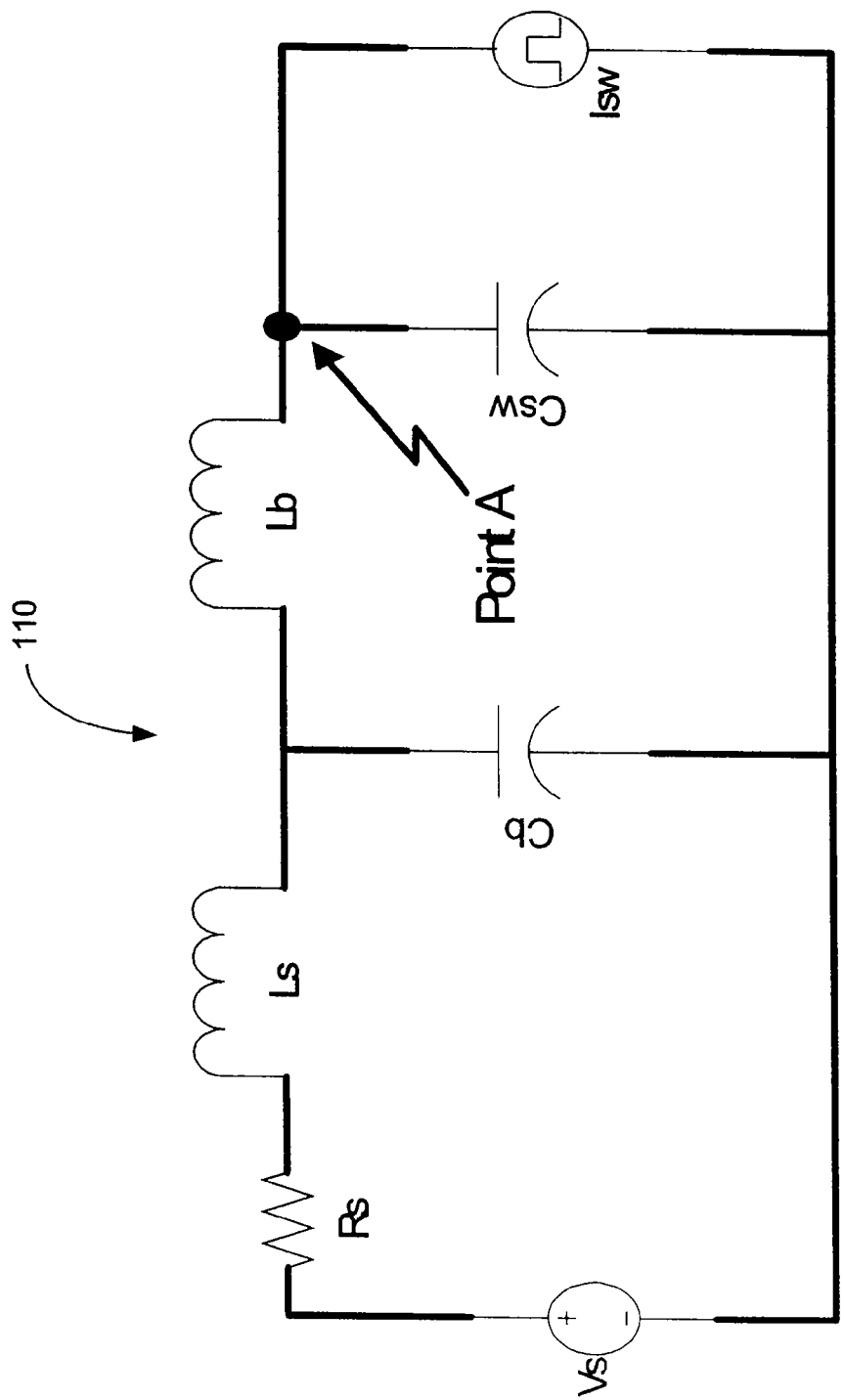
FIG. 5 is an illustration of a modeled TDM switch with an external power supply of the prior art.

FIG. 5 illustrates a circuit model of a TDM switch having an external power supply. The power supply is modeled by an ideal voltage source Vs, an output resistance Rs and an inductor Ls. The inductor Ls models the inability of the power supply to rapidly change its current output. The capacitor Cb represents the printed circuit (PC) board filtering capacitors of the switch. Parasitic inductances on the PC board are represented by the inductor Lb. The TDM switch is modeled by a variable current source Isw with demand profiles that vary with the changes in data and an on-chip filtering capacitor Csw. Point A is a measured voltage value.

For example, a SONET STS-48 frame includes the framing bytes A1 and A2, the section trace byte J0, and the Z0 and payload bytes. The A1 bytes have a constant value of 'hF6, while the A2 bytes have a constant value of 'h28. The J0 byte is arbitrary. The Z0 bytes tend to be all-zeros in many applications. The payload bytes are assumed to have random data. From a current demand point of view, there would be no current needed to charge and discharge parasitic capacitors during the A1, A2 and Z0 bytes. However, there would be isolated current spikes at the A1 to A2 transition, the A2 to J0 transition and the J0 to Z0 transition. During the payload bytes, the current demand would be at a statistical average level due to the random nature of the data.

Figure 6:
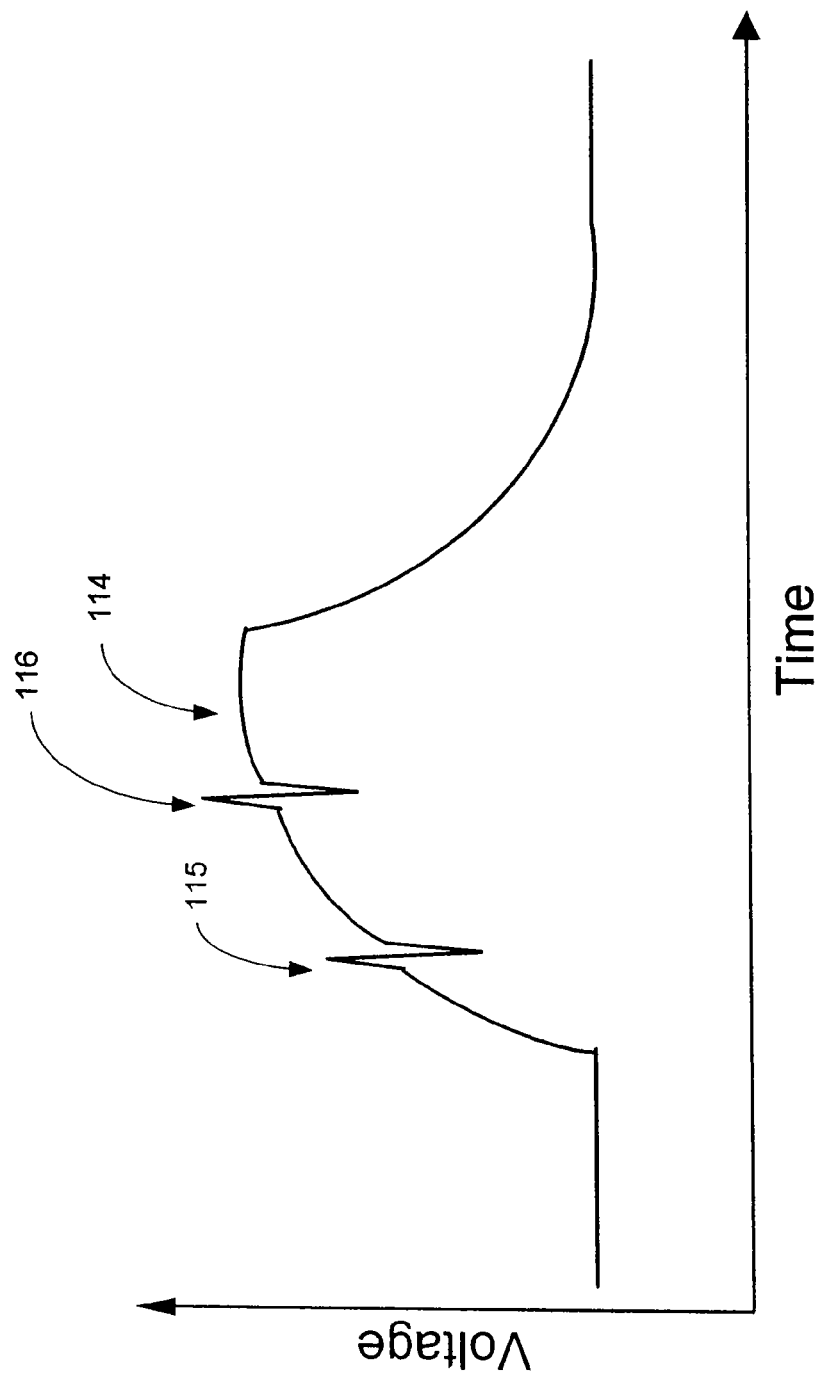
FIG. 6 is a graphical representation of the voltage levels at point A of the modeled TDM switch in FIG. 5 of the prior art.

FIG. 6 illustrates the voltage at Point A of FIG. 5. During the times when payload bytes are delivered to the TDM switch, the number of transitions in the data would average to 4 bits for every byte. As such, the voltage at Point A would settle to an average value. However, as the 48 A1 bytes are cycled through, the current demand for charging and discharging the data fanout tree would fall to zero. The power supply would react very slowly to the drop in current demand, and the capacitor Cb would charge up and the voltage at Point A would rise. Similarly, the voltage at Point A would continue to rise during the A2 and Z0 byte cycles because of the low current demands. At the transitions between A1 and A2 bytes, the data undergoes 6 bits of changes per byte ('hF6 XOR 'h28='b1011110). Due to parasitic inductances and capacitances on the PC board, this isolated current spike leads to a voltage spike and ringing at the Point A of FIG. 5. Similar voltage behaviour is also observable around the J0 byte. When random payload data resumes, the current demand returns to the average value and Cb discharges. Unfortunately, theses voltage variations can adversely affect sensitive analog circuits inside the TDM switch and in other devices residing on the same PC board. In addition, sharp current and voltage spikes are a source of electro-magnetic interference (EMI) in equipment, which need to be minimized or eliminated altogether.

In FIG. 6, there are two noise behaviours related to voltage level changes in the fanout tree illustrated. The first noise behaviour shown is a "hump" 114 caused by a transition in the current consumption from a long term average to zero. The second noise behaviour is illustrated by short term spikes 115 and 116 caused by the simultaneous transition of data bits within the fanout tree. The present invention seeks to eliminate the hump by reducing the long term average power consumption of the fanout tree. Furthermore, the present invention provides a constant overwrite method implemented in conjunction with the ingress and the egress data disable methods to reduce the amplitude of the spike. The overwrite method as implemented by the present invention is discussed in further detail with reference to FIG. 9.

Figure 7:
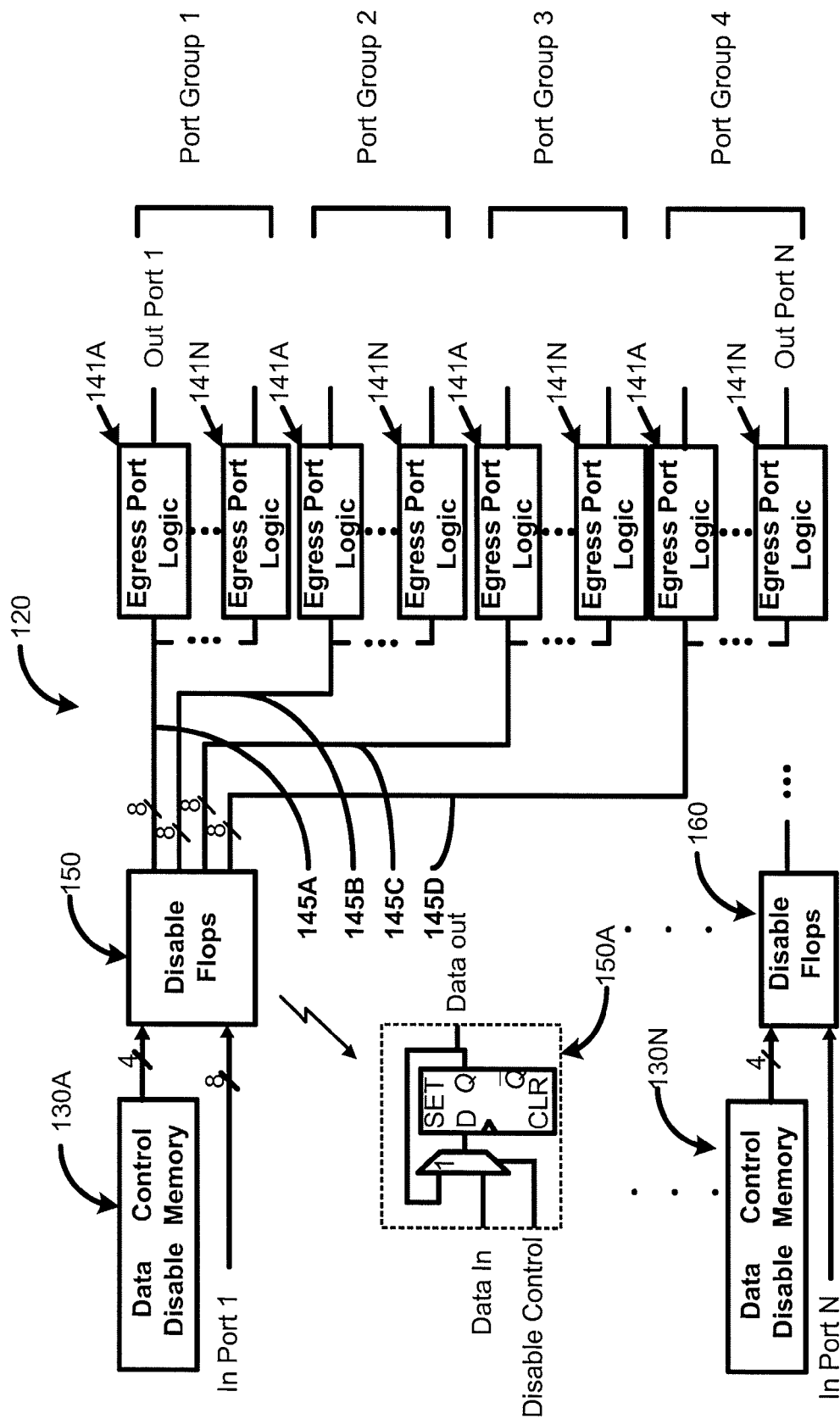
FIG. 7 is an illustration of an output buffered memory switch having a power management functionality according to the present invention.

FIG. 7 illustrates an output buffered memory switch 120 having a power management functionality, termed the ingress data disable method, according to the present invention. The switch 120 differs from that of FIG. 4 of the prior art in that the switch 120 consists of egress ports partitioned into multiple egress port groups. The present invention requires additional logic to disable the propagation of one or more ingress grain if the ingress grain is not selected by any ports within an egress port group. The power management scheme splits the fanout of ingress data from each ingress port In Port 1, . . . In Port N, to the egress ports Out Port 1, Out Port 2, . . . . Out Port N, into groups of two or more. In FIG. 7, there are four groups of egress ports, Port Group 1, Port Group 2, Port Group 3, Port Group 4, shown. The first egress port group, Port Group 1, consists of a plurality of egress ports, 141a, . . . , 141n. The second egress port group, Port Group 2, consists of a plurality of egress ports, 142a, . . . , 142n. The third egress port group, Port Group 3, consists of a plurality of egress ports, 143a, . . . , 143n. Finally, the fourth egress port group, Port Group 4, consists of a plurality of egress ports, 144a, . . . , 144n. Splitting the fanout into groups Port Group 1, Port Group 2, Port Group 3, Port Group 4, facilitates disabling of the toggle activity. The splitting of port groups on the egress side disables the fanout of ingress grains to a given port group from an ingress port, where a grain from the ingress port is not selected for output by any port within the given port group. For example, if the ingress grain for timeslot one, of ingress port one In Port 1, is only selected for output by egress port one Out Port 1, then port groups, Port Group 2, Port Group 3, Port Group 4, do not select the ingress grain. Therefore, the fanout to port groups Port Group 2, Port Group 3, Port Group 4, from ingress port one In Port 1 can be disabled for timeslot one.

The ingress data disable method also provides data disable control memory 130a, . . . 130n, having one bit of disable information per grain and per egress port group Port Group 1, Port Group 2, Port Group 3, Port Group 4. Each bit of control information marks ingress grains that are selected for output by any port within an egress port group Port Group 1, Port Group 2, Port Group 3, Port Group 4. The disable information is used to hold the data grain for the specified timeslot and for each fanout tree 145a, 145b, 145c, and 145d, of the associated egress port group Port Group 1, Port Group 2, Port Group 3, Port Group 4. A method for storing data 150a, using a 2:1 multiplexer, is implemented in FIG. 7, although other techniques are possible, such as clock gating.

The total maximum power consumed by the switch logic, 130, 140, 150, 160 and the fanout tree 145 is proportional to the number of egress port groups.

$$P_{total} = \frac{\sum_{m=1}^{\#ofIngressPorts} PFanoutFromIngressPortmToAllEgressPorts}{NumberofEgressPortGroups}$$

where $P_{FanoutFromIngressPortmToAllEgressPorts}$ is the power consumed during the fanout from Ingress port m to all egress ports; m is the number of ingress ports; and $P_{total}$ is the total power consumed by the logic and fanout from the ingress block to all egress ports.

The above-noted equation is applicable to a small number of egress port groups. A decrease in the level of total power consumed, $P_{total}$, is negated by the need to increase the data disable control memory, 130a, ..., 130n, and additional area required for wiring when the number of port groups is large.

Figure 8:
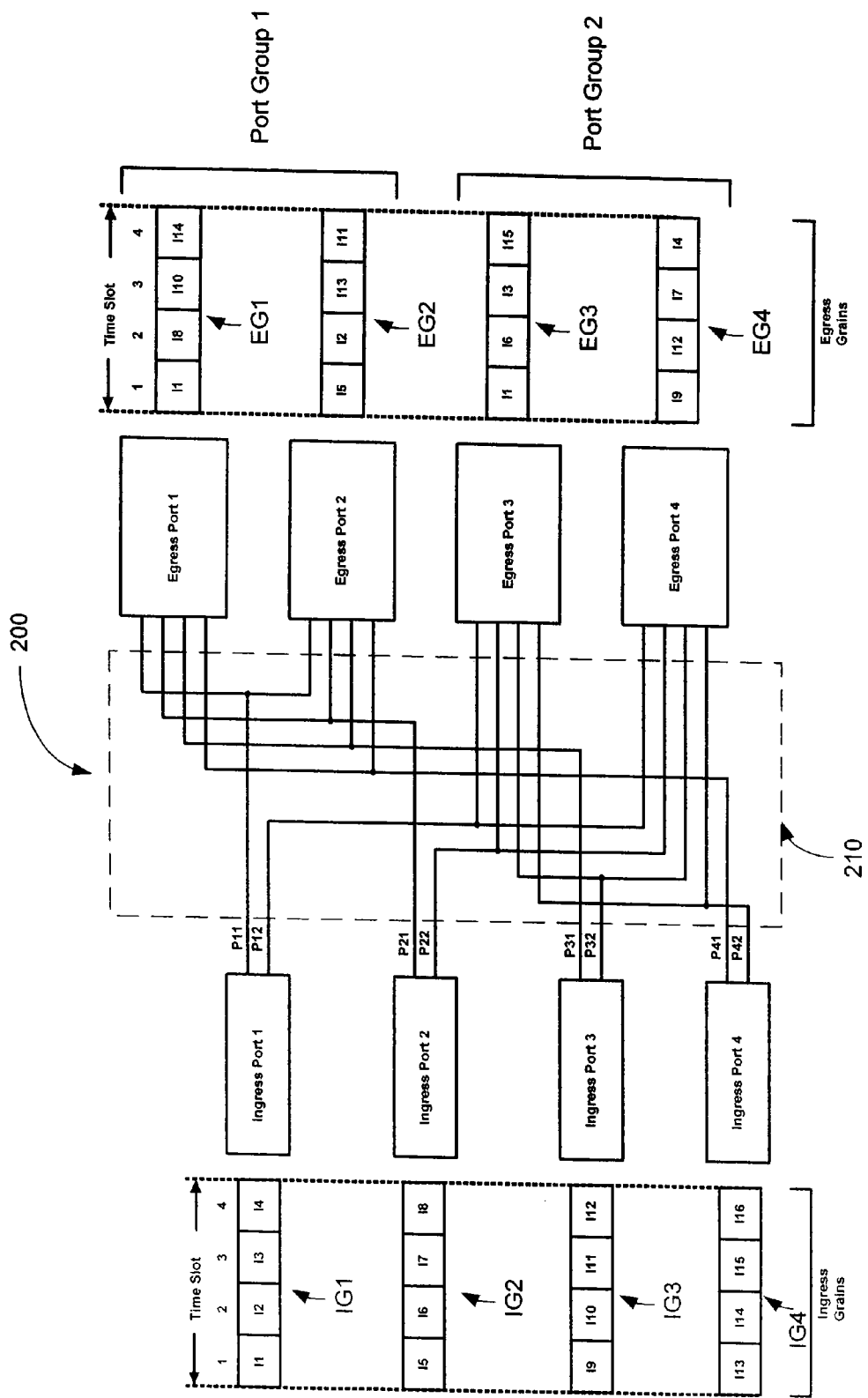
FIG. 8 is an illustration of a four-port memory switch having two port groups, according to the present invention.

FIG. 8 illustrates a four-port switch 200 with two port groups, Port Group 1, Port Group 2, in accordance to the present invention. The switch consists of ingress ports, Ingress Port 1, Ingress Port 2, Ingress Port 3, Ingress Port 4, and egress ports Egress Port 1, Egress Port 2, Egress Port 3, Egress Port 4. Each ingress port transmits a series of ingress grains I1, I2, ..., I16. The ingress grains I1, I2, ..., I16 are grouped into grain groups IG1, IG2, IG3, 1G4. In FIG. 8, there are four ingress grains in each grain group. The ingress grains I1, I2, ..., I16 are switched to the egress ports, Egress Port 1, Egress Port 2, Egress Port 3, Egress Port 4, from the ingress ports Ingress Port 1, Ingress Port 2, Ingress Port 3, Ingress Port 4. The switching of ingress grains I1, I2, ..., I16 is enabled through a group of switch connections 210, as shown in FIG. 8. At each of the four egress ports, Egress Port 1, Egress Port 2, Egress Port 3, Egress Port 4, four egress grain groups EG1, EG2, EG3, EG4, are derived from the ingress grains I1, I2, ..., I16.

In operation, each of the egress ports Egress Port 1, Egress Port 2, Egress Port 3, Egress Port 4 selects corresponding ingress grains based on a pre-defined egress grain and a pre-defined egress grain group. The selection of ingress grains I1, I2, ..., I16 depends on which, if any, ingress grains are required for output at the egress of the switch 200. Based on an output requirement, the switch 200 will enable the propagation of ingress grains I1, I2, ..., I16 from the ingress ports Ingress Port 1, Ingress Port 2, Ingress Port 3, Ingress Port 4, to the egress ports Egress Port 1, Egress Port 2, Egress Port 3, Egress Port 4. It should be noted that in FIG. 8, each egress grain group consists of ingress grains from a combination of ingress ports. Each of the ingress grains I1, I2, ..., I16 are not necessarily selected in this example, i.e., ingress grain 16, I16, does not form part of an egress grain group. Also, ingress grains may be selected and thereby switched to a plurality of egress ports. For example, ingress grain one I1, in timeslot 1, is multicast to timeslot 1 of two egress ports, Egress Port 1, Egress Port 3.

The fanout power required to switch a grain from an ingress port, n, to an egress port group, m, is denoted as Pnm, in FIG. 8. Accordingly, each connection between an ingress port and an egress port has a corresponding fanout power denoted as, P11, P12, P21, P22, P31, P32, P41, P42. The fanout power from each ingress port to an egress port group is approximately equivalent. Furthermore, the total fanout power from a given ingress port is equivalent to the sum of the fanout power to the port groups as noted below.

$$P_n = \sum_{m=1}^{\#ofEgressPortGroups} P_{nm}$$

where $P_{nm}$ is the fanout power required to switch a grain from an ingress port, n, to an egress port group, m; and $P_n$, is the sum of the fanout power to the m egress port groups from an ingress port n.

The total fanout power from all ingress ports is the sum of the fanout power from all ingress ports as noted below.

$$P_{total} = \sum_{n=1}^{\#ofIngressPorts} P_n$$

where $P_n$ is the sum of the fanout power to the m egress port groups from an ingress port, n; and $P_{total}$ is the sum of the fanout power from n ingress ports.

TABLE 1 below enumerates the fanout power P11, P12, P21, P22, P31, P32, P41, P42 consumed by the switch 200, of FIG. 8. A "one" entry in the table indicates that the associated grain, for a given timeslot, is propagated to an egress port group and that power is consumed. A "zero" entry indicates propagation is disabled. For example, a data disable control memory for each ingress port consists of a four-word memory (one word per timeslot) of two bits per word (one bit per egress port group). If bit zero enables propagation of an ingress grain to port group 1 and bit one enables propagation of an ingress grain to port group 2, the content of data disable control memory for ingress port one is b11, b01, b10, b10 for the memory addresses of timeslot one through four, respectively. It should be noted that in this example that a 1-bit state enables propagation. However, the bit logic may be reversed in that a 0-bit state enables propagation.

TABLE 1

| | Timeslot | | | |
|---|---|---|---|---|
| Power | 1 | 2 | 3 | 4 |
| P11 | 1 | 1 | 0 | 0 |
| P12 | 1 | 0 | 1 | 1 |
| P21 | 1 | 0 | 0 | 1 |
| P22 | 0 | 1 | 1 | 0 |
| P31 | 0 | 1 | 1 | 0 |
| P32 | 1 | 0 | 0 | 1 |
| P41 | 1 | 1 | 0 | 0 |
| P42 | 0 | 0 | 1 | 0 |

The switch 200 example, of FIG. 8, illustrates several important advantages of the present invention. A unicast ingress grain, for example ingress grain 10, requires fanout to one egress port group only. Thus, there is a power savings for unicast ingress grain traffic, a ratio of 1:number of egress port groups, as the fanout tree for only one egress port group need be enabled. Grains that are multicast to more than one port, for example I1, require the fanout to one or more egress port groups to be enabled. However, multicast of an ingress grain to m egress ports reduces the total number of ingress grains that can be forwarded to the egress ports by (m−1). Therefore, fewer (m−1) ingress grains will be forwarded to any of the egress port groups for each ingress grain that is multicast to m egress timeslots. According to FIG. 8, ingress grain I1 is multicast to two port groups, Egress Port 1, Egress Port 3. As a result, only 15 ingress grains are forwarded to egress ports and the 16th ingress grain, I16, is not forwarded to the egress ports. Additional power savings will result from multicast of an ingress grain to ports, within the same egress port group, as the number of fanout trees that need to be enabled for the grain is further reduced.

The equation noted below denotes the power reduction which may be achieved through the present invention.

$$\% \text{ Saving} = \left[ 1 - \frac{\begin{array}{c} \#ofUCGrains + \\ \sum_{m=1}^{\#ofEgressPortGroups} m \times \#ofGrainsMCTo\ \text{``}m\text{''}PortGroups - \\ \sum_{g=1}^{\#ofIngressGrainsMC} (\#ofDestinationsforGrains\ \text{``}g\text{''} - 1) \end{array}}{\#ofEgressPorts \times \#TimeslotsPerGrainsGroup \times \#ofEgressPortGroups} \right] \times 100\%$$

where

MC is an abbreviation for multicast;
UC is an abbreviation for unicast; and
% Saving is the percentage of power reduction.

The power savings for the switch 200 example, of FIG. 8, are at a minimum 50%, as the example uses two egress port groups. The practical limit to the number of egress port groups is dependent on the IC technology. The power savings, achieved through disabling ingress grains, are offset by an increase in IC area. The IC area is defined by the routing wires required for connection to the egress port groups and the memory required to store the data disable information therein.

The egress data disable method is a variation of the ingress data disable method where egress ports are grouped to disable propagation of data to a given group, as explained with reference to FIGS. 7 and 8. In the egress data disable method, the fanout tree is disabled from the tail of the tree towards the root by using decoded connection memory settings to enable propagation of data for only those grains that are selected for egress. The decoding can be achieved on a per port basis or by grouping ports. The egress data disable method provides the same power savings as the ingress data disable method for the portion of the fanout tree that is disabled.

According to the present invention, the ingress and egress data disable methods provide a combined power management scheme that reduces average power consumption. This reduction is accomplished by enabling the propagation of only those grains or subset of grains that are selected for egress through the fanout tree. Accordingly, the level of power required is averaged over a grain group period. However, the instantaneous power for a specific timeslot within a grain group may be considerably higher than the average—this can occur if the switch settings are programmed such that a large percentage of the fanout tree is enabled. As explained previously with reference to FIGS. 5 and 6, a significant current spike will occur if the data in the fanout tree toggles from an "all zeroes" pattern in the timeslot preceding the enabled timeslot to an "all ones" pattern during the enabled timeslot, or vice versa. To eliminate such spikes, the present invention provides a disabled data constant overwrite method.

The disabled data constant overwrite method ensures the worst case "all ones" to "all zeroes" transition is reduced to the equivalent of half the bits changing. Therefore, the worst case current peak is reduced by a factor of one-half. The present invention achieves this reduction by overwriting disabled grains with a constant value with half the bits asserted. A pair of egress port switching blocks will utilize complementary constants to ensure the difference in the number of bits that toggle is always one-half the total number of bits in the fanout tree when the entire fanout tree is enabled.

Figure 9:
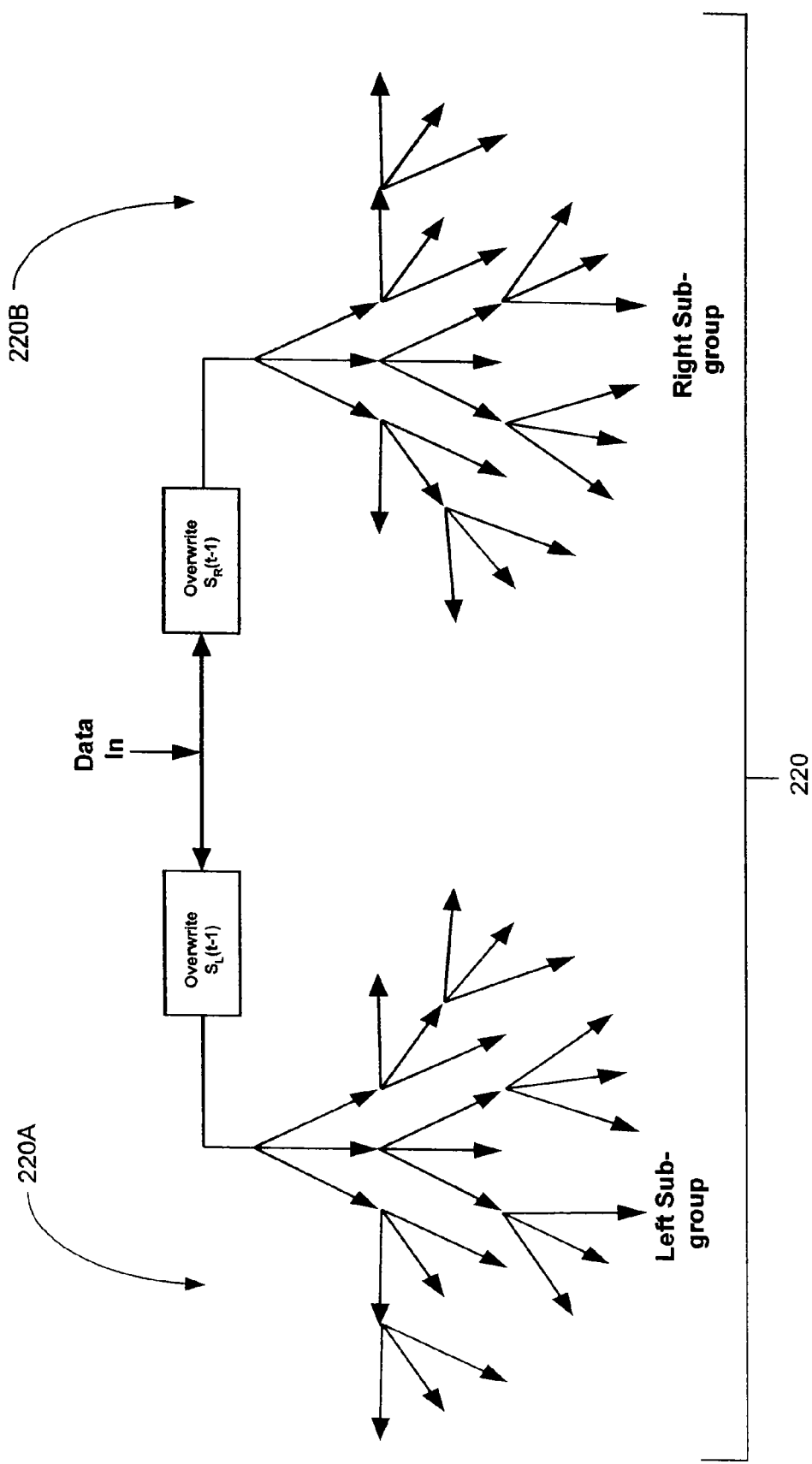
FIG. 9 is an illustration of a constant overwrite data fanout tree implemented by the egress data disable method according to the present invention.

To further explain the disabled data constant overwrite method, FIG. 9 illustrates a byte-wide data fanout tree 220 that has been split into two sub-trees 220A, 220B. Disabled grains in the left sub-tree 220A are overwritten with the hexadecimal pattern $S_L(t-1)$, from its root to its tail, and the right sub-tree 220B with the hexadecimal pattern $S_R(t-1)$, again from its roots to its tail. In this particular example, the overwrite is defined as a replacement of the disabled data with the overwrite pattern. Time t ranges from 0 to G−1, where G is the total number of grains in a grain group. A Count function (C[.]) counts the number of bits that are set high in a data bus. For example, C['h55]=4 and C['h12]=2.

$S_L(t-1)=\{0F\}$ (In hexadecimal)
$S_R(t-1)=\{F0\}$ (In hexadecimal)

The number of bits that toggled ($B_T$) at timeslot t is given by the equation below. D(t) represents the input data at time t. The calculation assumes the worst case where the entire fanout tree 220 is enabled at timeslot t and disabled during the timeslot proceeding t.

$$B_T(t)=C[D(t) \oplus S_L(t-1)]+C[D(t) \oplus S_R(t-1)]$$

Substituting the values of $S_L(t-1)$ and $S_R(t-1)$ into the above equation yields the total number of bits that toggle between timeslot as follows:

$$B_T(t) = C[D(t) \oplus \text{`h0F}] + C[D(t) \oplus \text{`hF0}]$$
$$= 8$$

As can be seen from the equations above, the number of bits that toggled between a timeslot where all grains are enabled and a timeslot where all grains are disabled is always 8 for a byte wide bus. $B_T(t)$ is completely independent of the ingress data stream D(t). The worst case number of bits toggled without the disabled data constant overwrite method is 16, 8 bits for each half 220A, 220B of the fanout tree 220. Therefore, the amplitude of the current peak is reduced by one-half using the disabled data constant overwrite method. For fanout trees with different bus widths, the overwrite patterns would have to be scaled to match the width of the data. It should be noted that in this example $S_R(t-1)$ and $S_L(t-1)$ are selected such that each value has the same number of bits set to a one and zero with $S_R(t-1)$ being the complement of $S_L(t-1)$. For this example $S_R(t-1)$ is hF0 and $S_L(t-1)$ is h0F. However, other values of $S_R(t-1)$ and $S_L(t-1)$ will result in the peak current reduction of ½ provided half the bits of both values are a logic 1 and $S_R(t-1)$ is the complement of $S_L(t-1)$.

The disabled data constant overwrite method differs from switching noise reduction methods of the prior art, such as U.S. Pat. No. 4,724,340, issued to Sood, in that the disabled data overwrite is applied to signals internal to a data switch device. The overwrite method is provided in conjunction with a data disable method to reduce the noise generated by the fanout tree of the data switch. The peak amplitude of the noise voltage 114 of FIG. 6 is the sum of the amplitude of the hump and maximum amplitude of the voltage spike 116. The data disable method reduces the average power consumption of the device, and therefore, reduces the amplitude of the voltage hump 114 of FIG. 6. The disabled data constant overwrite reduces the peak amplitude of the spike 116 by an additional factor of ½. The disabled data overwrite mechanism for a data switch implementation requires the disabled data overwrite to be implemented in pairs of egress port switching blocks such as the ESS blocks of the ESS switch architecture. The constants used to overwrite disabled data for a pair of ESS blocks must be complementary. Furthermore, different pairs of ESS blocks must use different constants. The disabled constant overwrite method would be ineffective if the same overwrite constants, e.g. 0x0F or 0xF0 for byte wide data, were used for every pair of ESS blocks and the data is always disabled for all blocks with the same constants. In this case, the blocks that continue to receive enabled grains would overwrite with the same constant, and therefore, be susceptible to a maximum noise delta between adjacent grains should all the enabled grains be the complement of the overwrite constant. All ports receiving the same data is not uncommon in switching systems, the Z0/A1/A2 bytes are examples.

Figure 10:
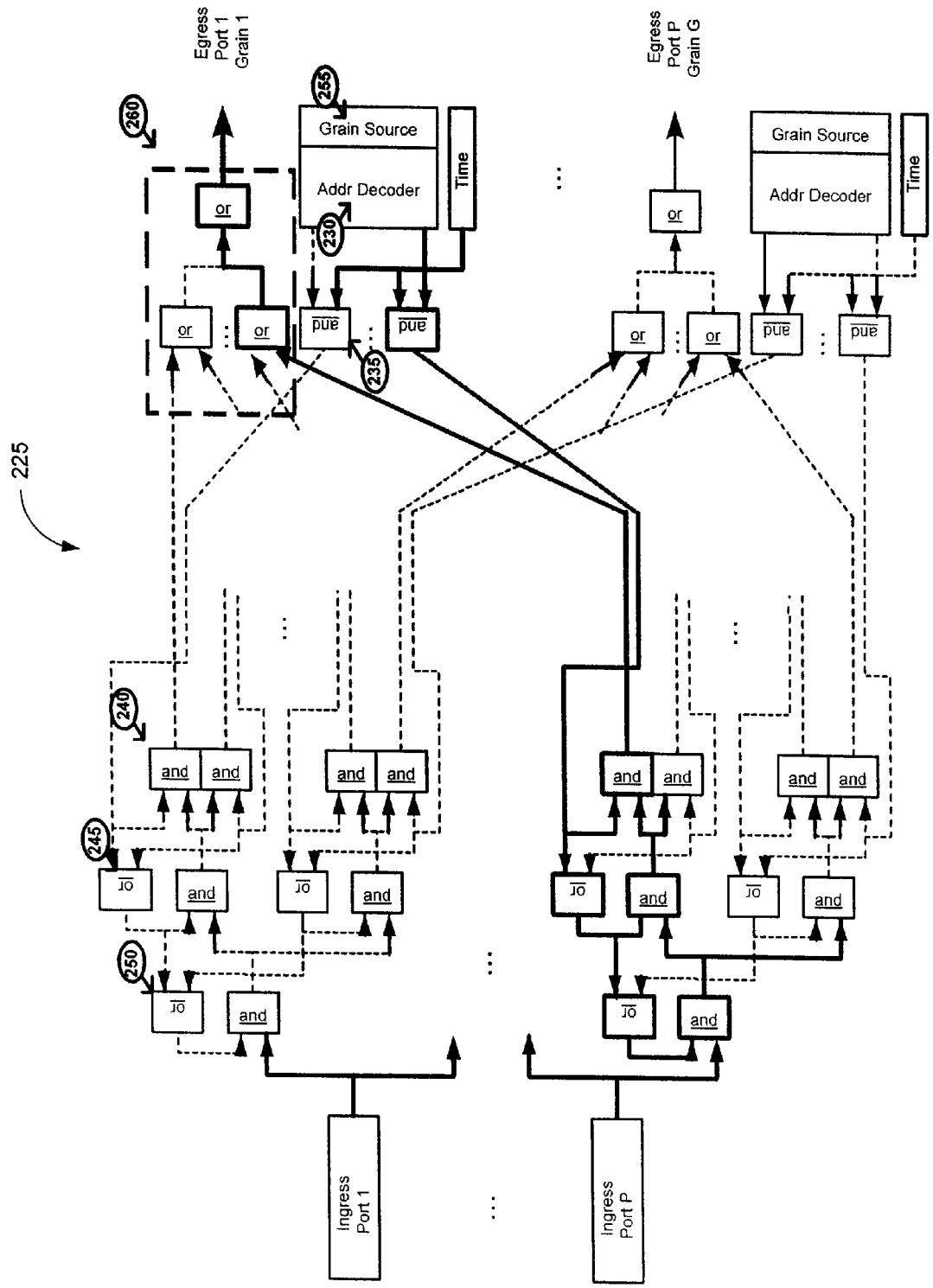
FIG. 10 is an illustration of an egress select data path according to the present invention.

According to the present invention, the egress select data disable method decodes connection memory to enable propagation of only those grains selected for egress through the complete path from the ingress ports to the egress ports. FIG. 10 illustrates an egress select data path 225. The data path consists of egress to ingress decode OR trees 250, ingress to egress data disable AND trees 240, and egress data OR logic 260 (clearly shown).

The egress data disable method decodes the connection memory 255 for each egress grain to generate N ingress enable signals, where one ingress enable signal is provided for each of the N ingress ports, by an address decoder 230, in FIG. 10. The enable signals are then ANDed 235 with timeslot information to generate a signal that is asserted for the timeslot specified by the connection memory setting. After the signal is generated, the ingress enable signal is propagated through an ingress decode OR tree 245 toward the ingress ports. Concomitantly with the enable signal propagation, data propagates through the ingress-to-egress data disable AND tree 240 toward the egress ports. The ingress decode OR tree information propagating from the egress side to the ingress side is used to gate the propagation of ingress data through the AND tree to the egress ports.

At the lowest level of the ingress decode OR tree, the ingress enable signal is used to gate the propagation of data from a single ingress port to a single egress grain 240. The next level of the ingress decode OR tree gates the propagation of data to two egress grains 245 with each successive level, thus enabling the propagation of twice the number of egress grains as the previous level. At the root of the ingress decode OR tree a single gate enables propagation of data from an ingress port to all egress ports 250. If an ingress grain is not selected for egress then the data fanout tree is completely disabled. If an ingress grain is selected for egress by a single egress port or subset of egress ports then only that portion of the AND tree utilized for delivering the grain is enabled. The output of the per ingress port AND trees are ORed per egress grain to generate egress port data 260.

Several properties of this egress select data path are noteworthy.
1) The fanout tree is enabled for only those grains selected for egress, and therefore, the mechanism is equivalent to the ingress data disable method where the number of port groups G is equal to the number of ports.
2) All logic paths are unidirectional with no fanout greater than two.
3) The logic trees replace the functionality of egress port multiplexer logic.

Figure 11:
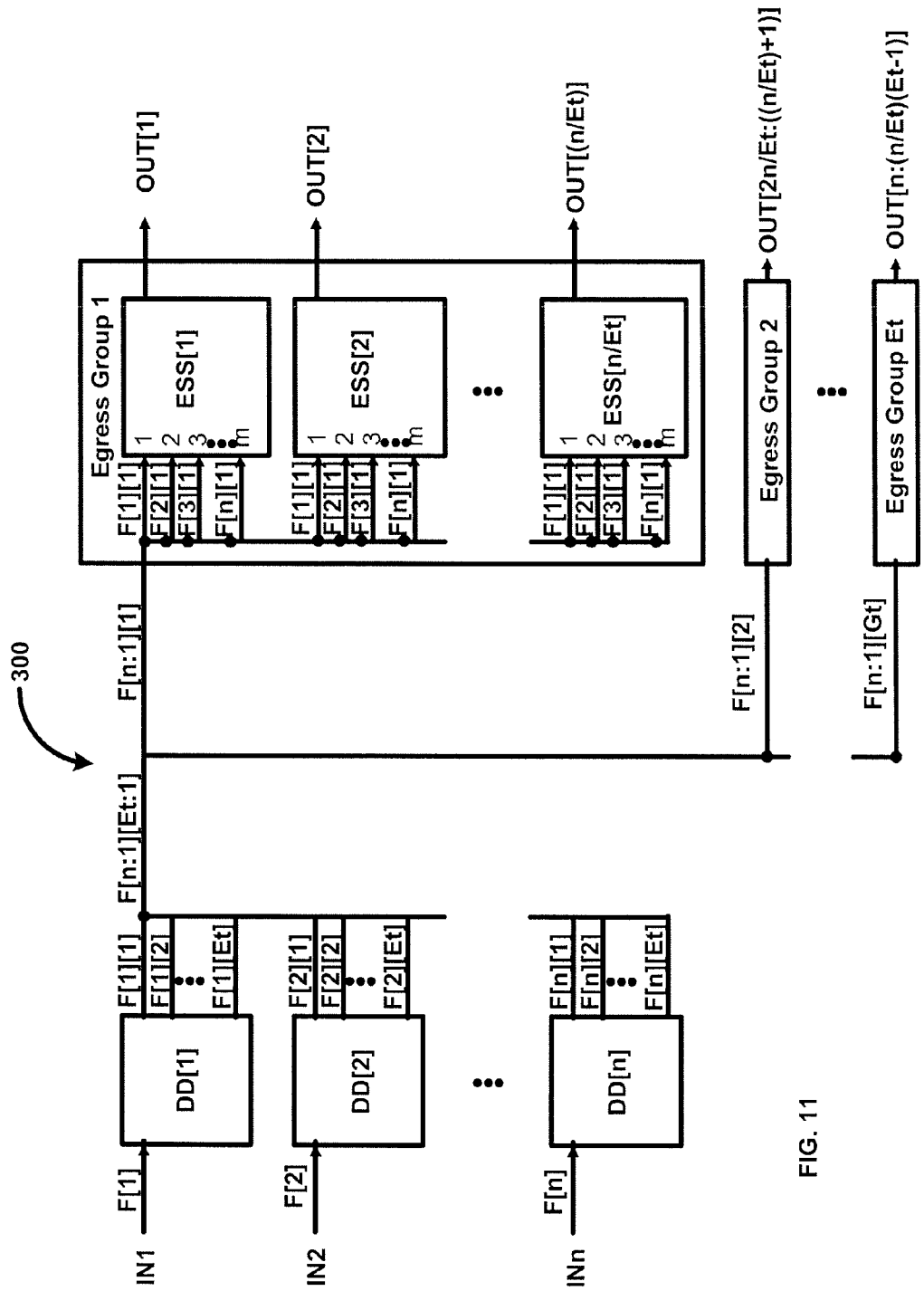
FIG. 11 is an illustration of an output buffered memory n×n switch having both data disable blocks and egress selection switch blocks according to the present invention.

Referring now to the switch architecture of the ingress and egress data disable methods, FIG. 11 illustrates an output buffered memory n port x n port switch 300, according to the present invention. The memory switch 300 includes N parallel data disable blocks, DD1, DD2, . . . , DDn, and a plurality of egress port groups, Egress Group 1, Egress Group 2, . . . , Egress Group Et. The number of data disable blocks, DD1, DD2, . . . , DDn, corresponds to the number, N, of ingress ports. Although an n port×n port switch 300 is shown, the invention is equally applicable to switches with an asymmetric number of ports. Each egress port group, Egress Group 1, Egress Group 2, . . . , Egress Group Et, consist of egress selection switch (ESS) blocks. The first egress port group Egress Group 1 includes a number of ESS blocks, ESS[1], ESS[2], . . . , ESS[n/Et].

On the ingress side of the switch 300, the data disable blocks, DD1, DD2, . . . , DDn, splits the fanout of ingress data from each ingress port to the egress ports into groups of two or more. Splitting the fanout into groups facilitates disabling of the toggle activity for the data fanout of ingress grains that are not selected for output by any port within the group. As noted in the previous $P_{total}$ equation associated with FIG. 7, the reduction in fanout power is inversely proportional to the total number of egress port groups (Et), when Et is small.

On the egress side of the switch 300, the ESS blocks, ESS[1], ESS[2], . . . , ESS[n/Et], buffer ingress grains for output to an associated egress port. While FIG. 11 only details the ESS blocks for the first port group, Egress Group 1, it is understood that subsequent port groups contain ESS blocks. Each ESS block performs two functions: selection and storage of a grain group of data from the ingress ports and output of the stored data to an egress port.

Figure 12:
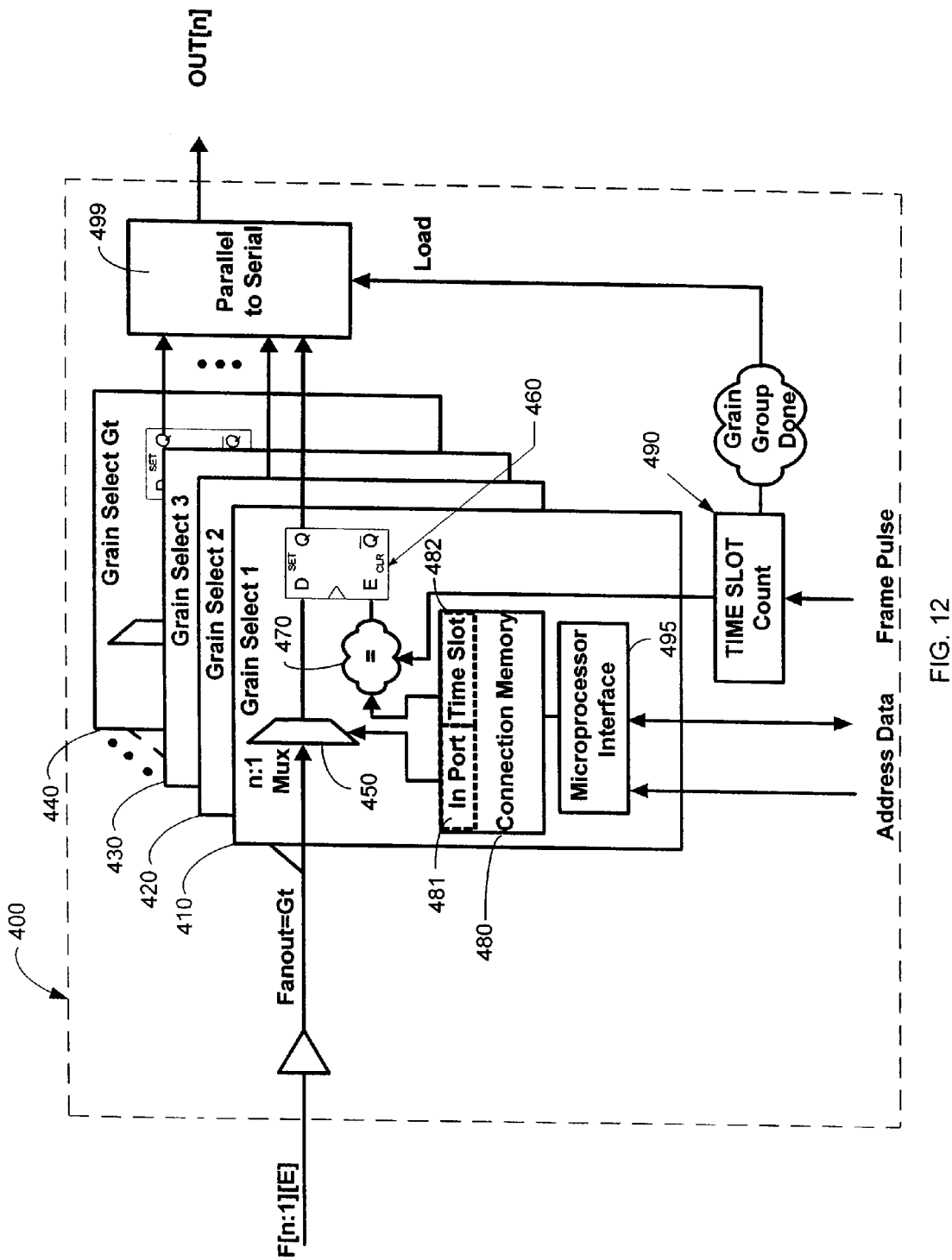
FIG. 12 is a block diagram of a hardware circuit layout of an ESS block according to the present invention.

FIG. 12 is a block diagram of the hardware circuit layout of an ESS block 400 for an egress group E, of FIG. 11. The ESS block 400 consists of multiple grain select blocks, 410, 420, 430, 440, one block for each grain of a grain group. In FIG. 12, the grain select block 410 consists of a N:1 multiplexer 450, a sampling flip flop 460 to store the output of the multiplexer, a timeslot comparator 470, and connection memory 480. The connection memory 480 is also coupled to a microprocessor interface 495. The block 410 further includes a timeslot counter 490 that marks the timeslot number of the ingress grains. The timeslot counter 490 is continuously incremented from 1 up to the grain group size, G. By synchronizing the timeslot counter 490 to a system frame pulse, the ingress grains are properly identified. It should be mentioned, for design purposes, that the timeslot counter 490 may be utilized by one or more grain select blocks. It is possible to substitute the flip flops with another variant, such as a data register or other storage device.

Within the grain select block 410, the connection memory 480 defines the ingress port and timeslot of the source grain for the egress grain associated with the grain select block 410. For example, grain select block one, 410, will store the ingress grain from the ingress ports that will be output at timeslot one to a corresponding egress grain group. The ingress port field 481 of the connection memory 480 controls the select input of the multiplexer 450. The multiplexer 450 will output all ingress grains from the pre-defined ingress port to the sampling flop 460. The timeslot field 482 of the connection memory 480 is then compared to the timeslot counter 490. When the two values are equal the sampling flip flop 460 is enabled and the desired grain is stored.

In operation, when the timeslot counter 490 reaches the count of the last grain of the grain group, the content of the sampling flip flops from the grain select block 410 is transferred to a register within the parallel to serial block 499. The data is then shifted out to the egress port OUT[n] as illustrated in FIG. 12. The grain select blocks 410, 420, 430, 440 and parallel to serial converter block 499 operate concurrently such that one grain group of data is shifted to the egress port while data for the next grain group is being sampled and stored by the grain select blocks 410, 420, 430, 440. Each grain select block 410, 420, 430, 440 selects the ingress grain that will be output at the associated timeslot of a grain group for the egress port of the ESS block 400. A parallel to serial converter 499 transfers the contents of the stored grains to a shift register (not shown) once every grain group and then serial shifts the grains to the egress port.

For example, an implementation of a SONET circuit switch may select a grain group size of 48 grains to process STS-48 signals. The ESS block for such a switch would then be composed of 48 grain select blocks. Each of the 48 grain select blocks select the ingress grain that will be output at the associated timeslot of a grain group for the egress port of the ESS block. A parallel to serial converter would then transfer the contents of the stored grains to a shift register once every 48 grains and then serial shifts the 48 grains to the egress port.

In accordance with the present invention, the operation of the grain select block 410 requires the programming of the connection memory 480 via the microprocessor interface 495, or similar means. The content of the connection memory for all ESS blocks is referred to as the switch settings. The switch setting of a specific grain select block defines the ingress port and timeslot of the grain that is captured in the sampling flip flop. The fanout tree to a given port group from the ingress port, specified in connection memory 480, must be enabled for the timeslot specified in connection memory 480. Therefore, the switch settings are used to determine if the fanout tree from an ingress port to a port group must be enabled for a given timeslot.

The connection memory 480 is implemented using storage devices such as D-type flip flops or latches. D-type flops and latches differ in the mechanism used to store input data. The output of a D-type flip flop is updated on one edge of the clock, either rising or falling depending on the type of flop used. The output of a latch is equal to the input when the clock is at one level (referred to as the transparent level). The output of the latch holds the input value that was present when the clock transitions from the transparent level to the opposite state. A latch is the preferable implementation as a latch typically requires less area to implement than a D-type flip flop.

It may be desirable to coordinate the changes in switch settings for all ESS blocks within a device, or for all devices within a given system. This requires two copies of connection memory 480. Each copy of connection memory for all the ESS blocks in a device is referred to as a page. The ESS blocks select ingress grains using connection settings from one page at a given time. This page is called the active page. The other page is referred to as the standby page. Coordination of a change in switch settings is accomplished by writing new settings to the standby page. At a specific point in time, all ESS blocks within a single device and all devices in a system receive a page select signal that instructs the ESS blocks to use connection settings from the standby page. The point in time for changing pages is typically a pre-defined point in a frame for SONET/SDH systems. Once a page switch is initiated, the standby page becomes the active page and the active page becomes the standby page.

Latches may be used to implement a single word of connection memory for each grain select block. As the connection memory content is static, the memory itself does not consume dynamic power. The power consumed by the fanout tree and multiplexer is considered part of the fanout of ingress data to all egress ports. It follows that a data disable block, utilizing latches may further reduce the power consumed by the fanout of the ESS block. The data disable block may be utilized in a similar implementation where ESS blocks may be grouped to minimize the fanout required.

FIG. 13*a* is a block diagram of a hardware circuit layout of a data disable block 500 according to the present invention. The purpose of the data disable block 500 is to disable the propagation of ingress grains to port groups that do not select the grain for output as specified by the connection memory content. The block 500 consists of a data disable control memory 510, a plurality of disable flip flops, 520, 521, . . . , 525, and a timeslot counter 530. Random access memory (RAM) is one type of memory which may be utilized as data disable control memory 510. The timeslot counter 530 identifies the timeslot of ingress grains that arrive via an F[n] input bus. The counter 530 is synchronized to a frame timing reference, similar to that of the ESS block 400 timeslot counter of FIG. 12. The input bus F[n] is connected to one of the disable flip flops 520, 521, . . . , 525 per egress port group. The disable flip flop 525 passes data to the port group bus F[n][Et:1] when enabled (E=1) and holds the previous value when disabled. The enable input of the disable flip flops 520, 521, . . . , 525 is controlled by a bit from the data disable control memory 510. Therefore, disabling the propagation of an ingress grain to all ports within an egress port group is accomplished by programming the corresponding bit in the control memory 510 via a microprocessor interface 550. As in the ESS block 400, the microprocessor interface 550 updates the bit information of the control memory 510.

FIG. 13*b* is an exploded view of the data disable flip flop 525 and its connections as shown in FIG. 13*a*. The flip flop 570 is a D-Type flip flop connected to both the input bus F[n] and the connection memory output K[Et]. According to FIG. 13*b*, when K[Et] is a logic 1, F[n][Et] is active and will toggle as required. When K[Et] is a logic 0, F[n][Et] is disabled and the flip flop stores its previous value—thus saving power as the capacitance associated with the F[n][Et] wires does not need to be charged or discharged.

Figure 14:
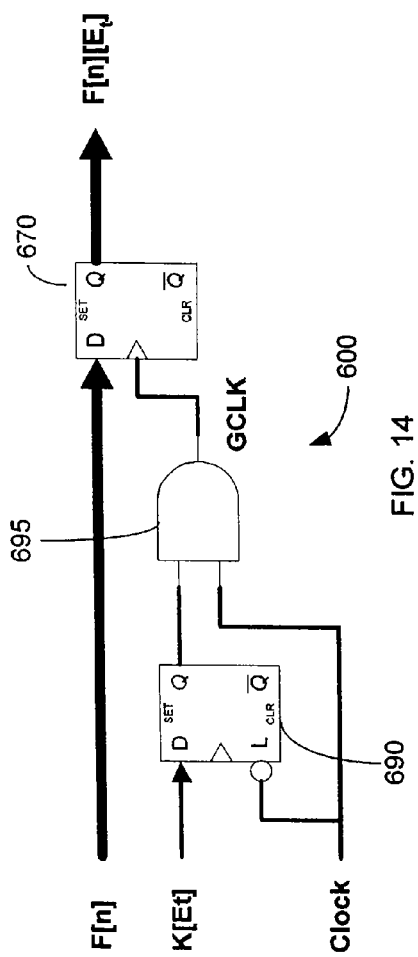
FIG. 14 is a block diagram of a hardware circuit layout of a clock gating circuit implemented as a variant to the data disable flip flop of FIG. 13b.

An alternative implementation to the disable flip flops 520, 521, . . . , 525 of FIGS. 13*a* and 13*b* is the use of a clock gating circuit 600 in FIG. 14. The clock gating circuit 600 holds the F[n][Et] data for disabled grains by disabling the clock input to the D-Type flip flop 670. A latch 690 holds the value of K[Et] when the clock input is high. If K[Et] is a one (grain is enabled), both inputs to the AND gate 695 will be a logic one and the D-type flip flop will be clocked. If the K[Et] is zero (grain is disabled), the AND gate 695 will prevent the D-type flip flop from receiving a clock and the D-type flip flop will hold its previous value. The clock input of D-type flip flops consume power even if the Q output does not toggle. In FIG. 13*a*, the clock inputs of the disable flip flops 520, 521, . . . , 525 continuously consume power. In comparison, the gated clock circuit 600 consumes clock input power for the D-type flip flop 670 only when data propagation is enabled. As such, the gated clock circuit 600 may be utilized to increase power savings in a switch system.

Figure 15:
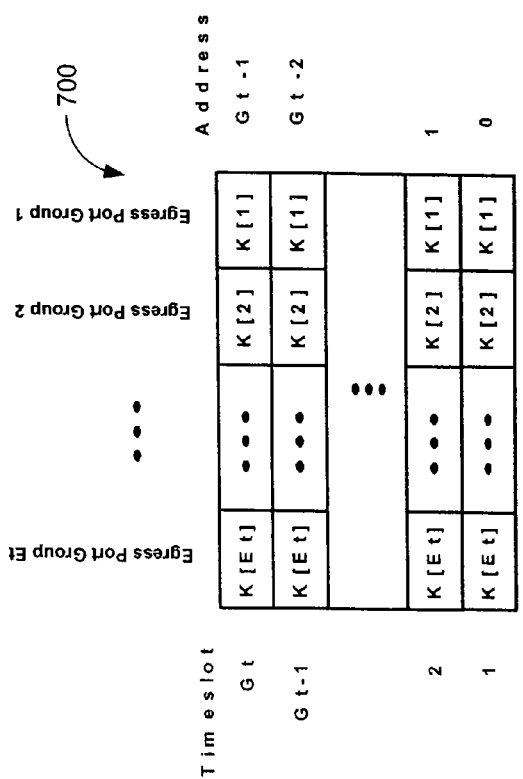

FIG. 15 illustrates a possible organization 700 of the control memory of the data disable block of FIG. 13*a*. The memory contains one word for every grain of the grain group. One bit of each word controls the data disable flop for an egress port group.

The present invention as described requires a microprocessor interface to each data disable and ESS block for the purpose of programming the data disable control and connection memories, respectively. As the disable control memory content can easily be derived from the connection memory settings, a single controller may be utilized to update the memory contents. An efficient implementation of a single controller would require a command bus that is daisy chained between the ESS blocks and the data disable blocks. In regular intervals, the controller would write to the connection memory followed by a read of all the current contents to facilitate the computing of new data disable control memory content by the data disable control block.

It is understood that the majority of the power consumed within the ESS block or any similar egress buffered memory switch occurs in the fanout between the ingress data and the grain select blocks. According to the egress data disable method, the egress data disable block decodes connection memory to enable the fanout tree for only those grains that are selected for egress. Ingress data can be enabled per port, or alternatively, ports can be grouped and enabled on a per sector basis. The decoded information can then be propagated further up the tree to realize additional power savings within the ESS block.

Figure 16A:
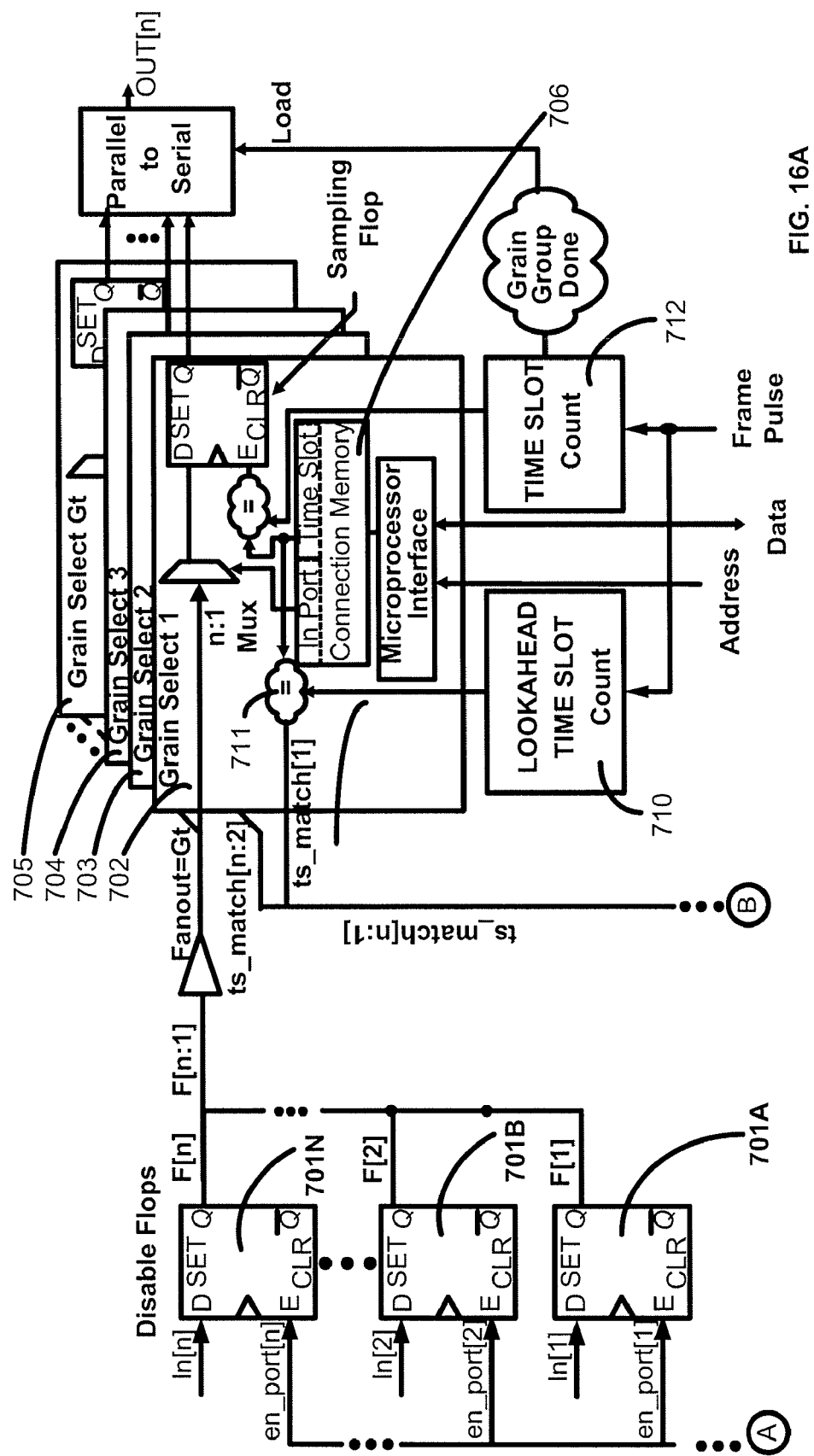
FIGS. 16A and 16B are block diagrams of an implementation of an egress data disable in an ESS block according to the present invention.
Figure 16B:
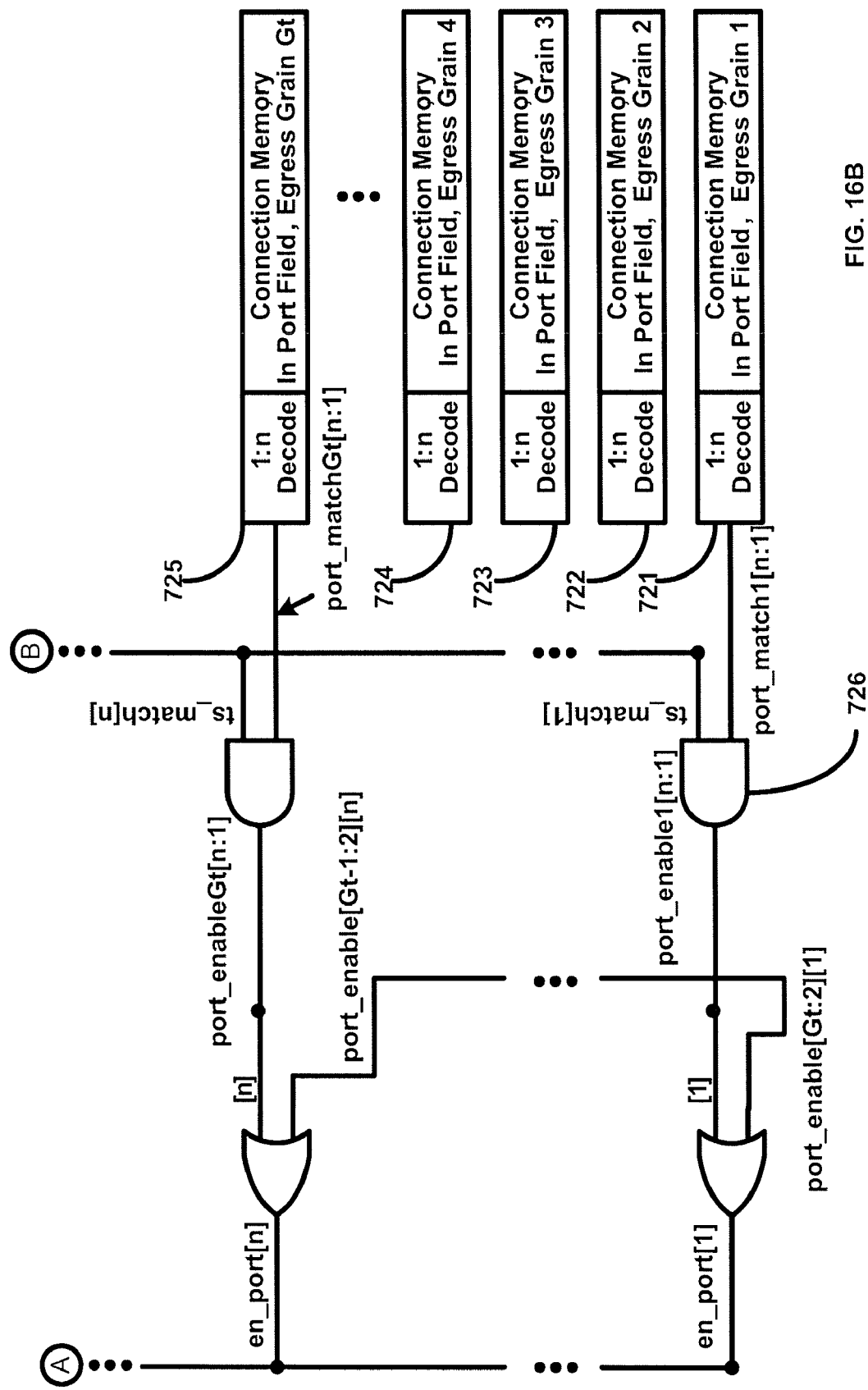

FIGS. 16A and 16B illustrates an embodiment of the present invention for implementing the egress data disable method in an ESS block with n input ports and n sectors. It should be readily understood that other embodiments obvious to the skilled artisan may be realized. In FIG. 16A, input registers 701A, 701B, . . . , 701N are enabled if an ingress grain is selected for egress by any of the grain select blocks 702, 703, 704, 705, and is disabled for grains that are not selected by any of the grain select blocks 702, 703, 704, 705. Enable signals en_port[1], en_port[2], . . . , en_port[n] generated for the input registers 701A, 701B, . . . , 701N, where n is the number of ESS block input ports, are decoded from the grain select block connection memory 706. The method partitions the decoding logic for connection memory 706 into port decode logic and timeslot decode logic.

The timeslot decode logic consists of a look ahead timeslot counter 701 and a comparator 711 to generate a timeslot match signal ts_match[n:1] for each grain select block 701, 703, 704, 705. A ts_match signal for a grain select block 702, 703, 704, 705 is asserted if the respective block samples an ingress grain for the current timeslot. It should be noted that the timeslot decode logic will likely require pipeline stages (not shown) to meet timing requirements. The look ahead timeslot counter 710 runs ahead of the main 712 timeslot counter to compensate for pipeline stages that may be required in the decode logic and to compensate for the input register delay. There are also provided port decode logic data paths 721, 722, 723, 724, 725 (FIG. 16B), that consist of several components.

According to the egress data disable method, the port field of each grain select block connection memory is duplicated and decoded to create an n bit port match signal per grain select block. For example, the port field of connection memory 721 for grain select block 1 702 is decoded to create the port_match1[n:1] signal. Bit x of the port_match1[n:1] signal is asserted to indicate that the grain select block 1 702 will select data from a specific ingress port. Each bit of a port_match signal is ANDed with the single timeslot match bit from the associated grain select block to generate a port enable signal for every grain select block. Bit x of a port_enableGt signal will be asserted for timeslot t if the associated grain select block Gt 705 selects an ingress grain from port x and timeslot t. The logical OR of the port_enableGt[n:1][n] signals generate the enable signal en_port[1:n] for ingress port n of the ESS block. Bit x of the en_port[n] signal is asserted for timeslot t if any of the grain select blocks select the associated grain for egress. Duplication of the port field facilitates placing the decode logic adjacent to the disable flops during VLSI layout. Use of a single copy of the connection memory port field is an acceptable alternative implementation.

Both the ingress and the egress data disable methods reduce average power consumption in the fanout tree by enabling the propagation of only those grains or subset of grains that are selected for egress. However, instantaneous power for a specific timeslot within a grain group may be considerably higher than the average if the switch settings are programmed such that a large percentage of the fanout tree is enabled. For example, consider the case of an ESS block with n ingress ports and a grain group consisting of n grains. Connection memory can be programmed such that each of the n grain select blocks select data from a different ingress port but during the same timeslot. In this case, the entire fanout tree of an ESS block will be enabled for one timeslot and disabled for all other timeslots.

By utilizing the constant overwrite method, the worst case "all ones" to "all zeroes" transition is reduced to the equivalent of half the bits changing, thus reducing the worst case current peak by a factor of one half. Reduction is achieved by overwriting disabled grains with a constant value with half the bits asserted. In pairs of ESS blocks, the use of complementary constants ensures that the difference in the number of bits that toggle is always one-half the total number of bits in both pairs of the fanout tree.

Figure 17:
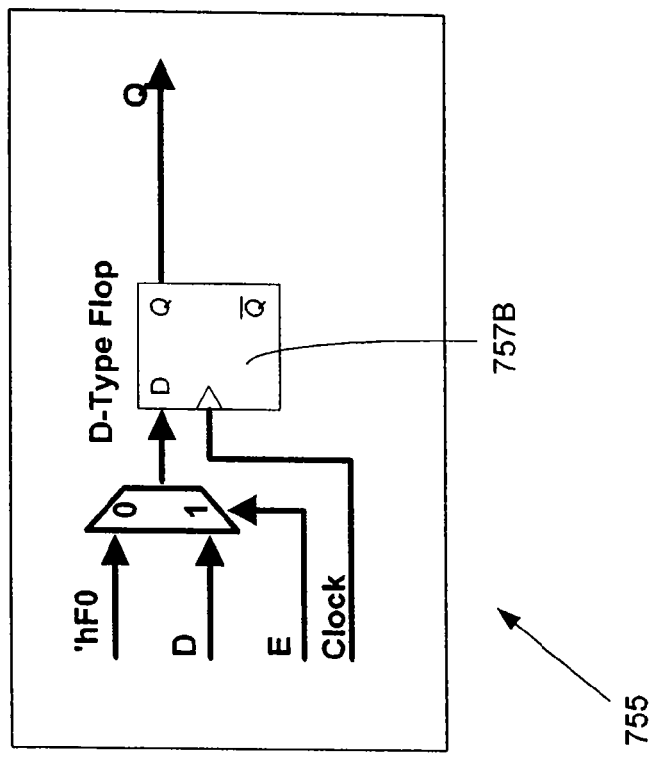
FIG. 17 is a data disable register with constant overwrite according to the present invention.
Figure 17:
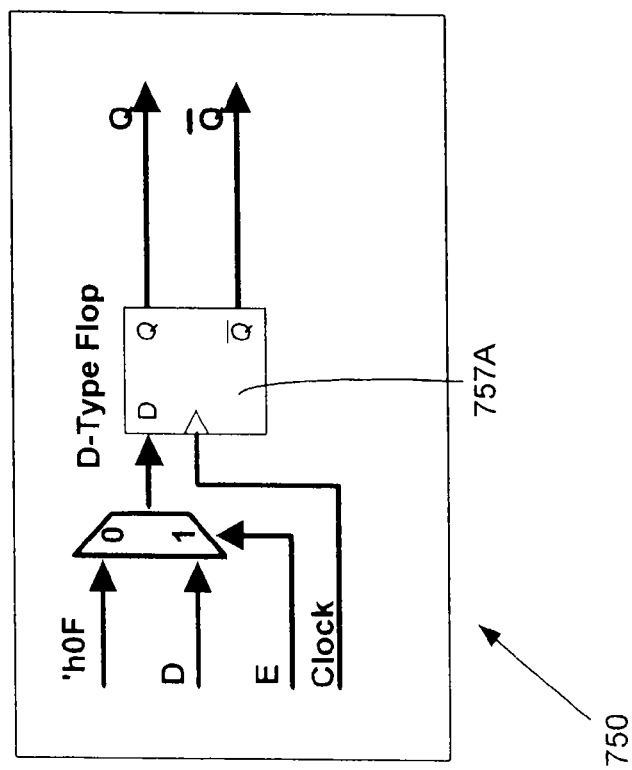

FIG. 17 illustrates a pair of ESS blocks 750, 755 each having respective data disable registers 757A, 757B for implementing the constant overwrite method. The data disable registers may be implemented in a data disable block, as shown in FIG. 13a. When either register is enabled (E=1), new data is stored. When either register is disabled (E=0), a constant is loaded. Each ESS block 757A, 757B provides a data disable register 757A, 757B with a constant that has half the bits set to a logic 1. The data disable registers 757A, 757B have complementary constants, where the constant used for the first 757A is the inverted value of the constant used for the second 757A, 757B for the pair of ESS blocks 750, 755 where the data disable registers replace the disable flops 701A, 701B, . . . , 701N, of FIG. 16. Pairs of ESS blocks would utilize different complementary constants.

Figure 18:
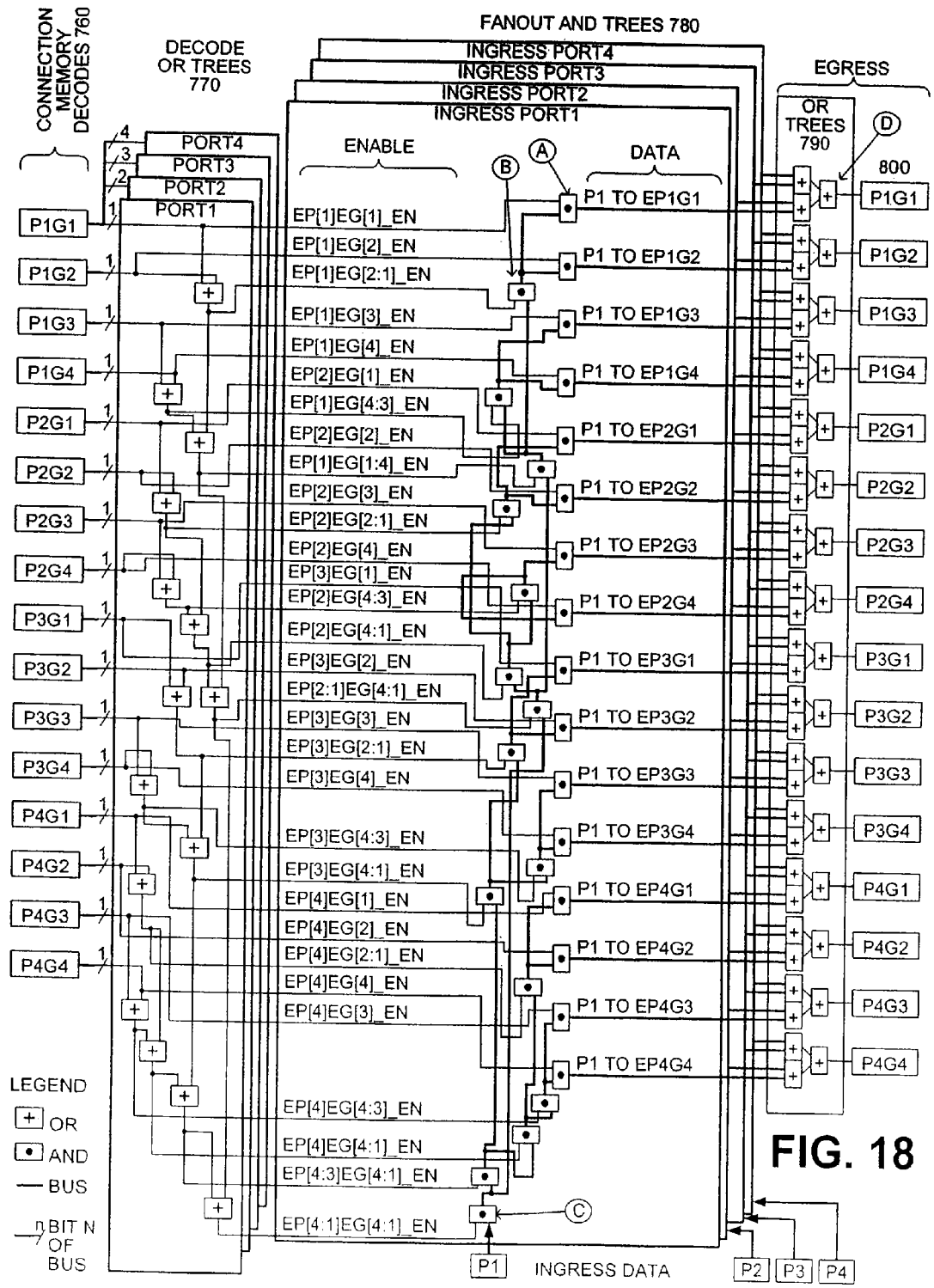
FIG. 18 is a block diagram of an egress select data disable for a 4 Port, 4 Grain per Port, Switch according to the present invention.

FIG. 18 illustrates an implementation of the egress select data disable method for a 4×4 switch with four grains per port. This methodology and architecture can be extended to include additional ports and grains per port. The implementation consists of connection memory decode logic 760, decode OR trees 770, data fanout AND trees 780, egress OR trees 790, and egress port logic 800. The implementation may also, as previously mentioned, require pipeline stages (not shown). The number of pipeline stages required is dependent on the manufacturing process used to implement the circuitry.

In FIG. 18, the per egress port and per timeslot connection memory values specifies the timeslot (t) and ingress port (i) that is selected for the associated egress port and timeslot. The connection memory decode logic generates an n-bit decode bus per egress grain where n is equal to the number of egress ports. Bit i of the bus is asserted for the timeslot t to mark the ingress grain that is selected for egress. For example, the block P1.G1 Connection Memory Decode specifies the connection memory setting for the first grain of egress port 1. Bit 1 of the outport bus is asserted if the connection memory specifies port 1 as a data source. The bit will be asserted for the timeslot specified in connection memory. The logic 726 used to generate the port_enable signals in FIGS. 16A and 16B illustrate one possible implementation of the connection memory decode logic.

The decode OR trees 770 form a hierarchy of enables for data propagating from the ingress ports to the egress ports via the data fanout AND trees 780. Pairs of enables from one layer of the hierarchy are combined to form the enable for the enables for the next layer of the hierarchy. At the lowest level of the OR tree the ingress enable signal is used to gate the propagation of data from a single ingress port to a single egress grain, shown at point A. The next level of the OR tree gates the propagation of data to two egress grains, shown at point B with each successive level enabling propagation to twice the number of egress grains as the previous level. At the root of the OR tree a single gate enables propagation of Ingress Port 1 Data from the first ingress port to all egress ports, shown at point C. If an ingress grain is not selected for egress then the data fanout tree is completely disabled. Each egress port has an associated OR tree and each ingress port has an associated AND tree.

Output data for a specific egress grain is formed from the logic OR 790 of the output from the AND trees 780. For example, the data for egress port 1/grain 1 Egress P1.G1 is formed by ORing the egress port 1/grain 1 outputs of the ingress port 1 through 4 AND trees, shown at point D.

Figure 19:
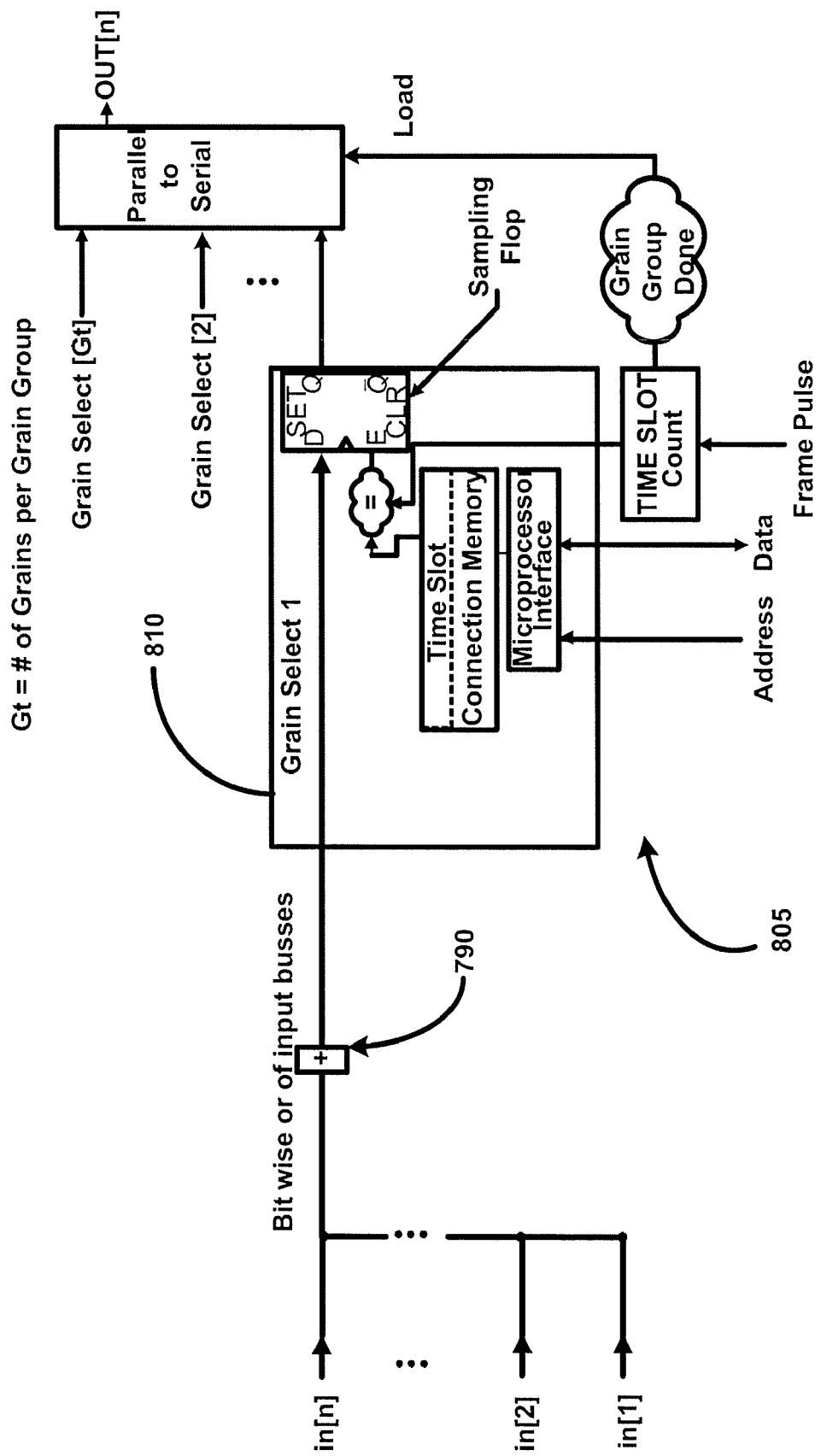
FIG. 19 is a block diagram of an ESS block modified to implement the egress select data disable method according to the present invention.

FIG. 19 illustrates an ESS block 805 similar to that of FIGS. 16A and 16B for implementing the egress select method. It should be mentioned that the egress OR trees 790 eliminate the need for a multiplexer in the grains select block 810, as was the case in FIGS. 16A and 16B. It is understood that the ESS block 805 would include a grain select block for each egress grain, and the data for each grain select block would be provided by data fanout AND trees.

The present invention may be further applied to any system where data must be fanout from a single source to many destinations and where the data is propagated over a pre-defined interval of time. Examples include output buffered or virtual output queue packet switches that schedule the delivery of ingress packets to egress ports over a periodic interval. The data disable block of the present invention is also applicable to any switch that requires fanout of ingress data to egress port logic. The power management scheme may also be applied to integrated circuits that implement SONET/SDH cross connect switches where low power consumption is required.

It should be understood that the preferred embodiments mentioned here are merely illustrative of the present invention. Numerous variations in design and use of the present invention may be contemplated in view of the following claims without straying from the intended scope and field of the invention herein disclosed.

What is claimed is:

1. A method of reducing power consumption in a time division multiplexing (TDM) egress selection memory switch having an ingress side with a plurality of ingress ports, an egress side with a plurality of egress ports, and fanout circuitry connecting the ingress side and the egress side, the method comprising:
    grouping the plurality of egress ports into at least two egress port groups;
    selecting and storing a given ingress grain delivered through the fanout circuitry for eventual output; and
    reducing average power consumption of the fanout circuitry by selectively propagating the ingress grain data to each said egress port group by disabling unselected grains and selectively overwriting bits in the disabled grains in the fanout circuitry with a constant value, the selected egress port group having at least one egress port for which the given ingress grain is selected for output.

2. The method of claim 1 wherein the step of reducing the average power consumption of the fanout circuitry further comprises:
    upon receipt of the ingress grain data at the selected egress port group, further selectively propagating the ingress grain data for decoding to a selected egress register within the at least one egress port for which the given ingress grain is selected for output.

3. The method of claim 2 wherein the further selective propagation for decoding to only the selected egress register is based on decoded connection memory settings.

4. The method of claim 1 further comprising:
    marking the given ingress grain as selected for output by any port within the selected egress port group.

5. The method of claim 1 wherein the constant value has an equal number of high and low bits, the disabled grains being internal to the switch, in order to reduce a timeslot transition peak power spike amplitude.

6. A system for reducing power consumption in a time division multiplexing (TDM) egress selection memory switch, the memory switch having an ingress side with a plurality of ingress ports, an egress side with a plurality of egress ports, and fanout circuitry connecting the ingress side and the egress side, the system comprising:
    at least one power reduction block for reducing average power consumption of the fanout circuitry by selectively propagating a given ingress grain to only a group of egress ports which is a subset of the plurality of egress ports by disabling unselected grains and selectively overwriting bits in the disabled grains in the fanout circuitry with a constant value, the group of egress ports having at least one egress port for which the given ingress grain is selected for output; and
    at least one grain select block for selecting and storing the given ingress grain for eventual output through the fanout circuitry, each grain select block including fanout information for propagating the ingress grain to the group of egress ports.

7. A method of power leveling in a time division multiplexing (TDM) egress selection memory switch having an ingress side with a plurality of ingress ports, an egress side with a plurality of egress ports, and fanout circuitry connecting the ingress side and the egress side, the method comprising:
    selecting and storing ingress grains for eventual output through the fanout circuitry;
    identifying disabled grains that will not be propagated through the fanout circuitry since no selected egress port exists for a given timeslot; and
    selectively overwriting bits in the disabled grains in the fanout circuitry with a constant value, the disabled grains being internal to the switch, in order to reduce a timeslot transition peak power spike amplitude.

8. The method of claim 7 wherein the constant value includes an equal number of logic 0 and logic 1 bits.

9. The method of claim 7 wherein selectively modifying bits in the disabled grains comprises:
    selectively modifying disabled grains in a first egress port switching block with a first constant value; and
    selectively modifying disabled grains in a second egress port switching block with a second constant value, the second constant value being a logical complement of the first constant value.

10. A system for power leveling in a time division multiplexing (TDM) egress selection memory switch, the memory switch having an ingress side with a plurality of ingress ports, an egress side with a plurality of egress ports, and fanout circuitry connecting the ingress side and the egress side, the system comprising:

at least one power leveling block for reducing a timeslot transition peak power spike amplitude of the fanout circuitry by selectively overwriting bits in disabled grains in the fanout circuitry with a constant value, the disabled grains being internal to the memory switch, the disabled grains not being propagated through the fanout circuitry since no selected egress port exists for a given timeslot; and at least one grain select block for selecting and storing ingress grains for eventual output through the fanout circuitry, each grain select block including fanout information for propagating the ingress grain to the group of egress ports.

* * * * *